United States Patent [19]

Strandjord et al.

[11] Patent Number: 5,296,912
[45] Date of Patent: Mar. 22, 1994

[54] RFOG ROTATION RATE ERROR REDUCER HAVING RESONATOR MODE SYMMETRIZATION

[75] Inventors: Lee K. Strandjord, Glendale; Glen A. Sanders, Scottsdale, both of Ariz.

[73] Assignee: Honeywell Inc., Minneapolis, Minn.

[21] Appl. No.: 821,667

[22] Filed: Jan. 16, 1992

[51] Int. Cl.[5] .......................................... G01C 19/72
[52] U.S. Cl. ................................................ 356/350
[58] Field of Search ........................ 356/350; 372/94

[56] References Cited

U.S. PATENT DOCUMENTS

| | | | |
|---|---|---|---|
| 4,514,088 | 4/1985 | Coccoli | 356/350 |
| 4,702,600 | 10/1987 | Handrich et al. | 356/350 |
| 5,018,857 | 5/1991 | Sanders et al. | 356/350 |

FOREIGN PATENT DOCUMENTS

| | | |
|---|---|---|
| 0416531A3 | 3/1991 | European Pat. Off. |
| 2182139A | 5/1987 | United Kingdom |

OTHER PUBLICATIONS

"Novel Polarization-rotating Fiber Resonator for Rotation Sensing Applications," G. Sanders et al, Fiber Optic and Laser Sensors VII, *Proceedings of SPIE*, vol. 1169 Sep. 1989, pp. 373-381.

"Evaluation of the Output Error in an Optical Passive Ring-Resonator Gyro with a 90° Polarization-Axis Rotation in the Polarization-Maintaining Fiber Resonator," K. Takiguchi et al, *IEEE Photonics Technology Letters* vol. 3 #1, Jan. 1991, pp. 88-90.

"Polarization Fading Effects in Polarization-Preserving Fiber Ring Resonator," P. Mouroulis, *Proceedings of SPIE*, vol. 1169, Fiber Optic and Laser Sensors VII (1989) pp. 400-412.

"Drift Reduction in an Optical Passive Ring-Resonator Gyro," K. Hotate et al, *Proceedings of SPIE*, vol. 1585 Fiber Optic Gyros: 15th Anniversary Conference (1991), pp. 116-123.

"Resonator Fiber Optic Gyro Employing a Polarization-Rotating Resonator," L. Strandjord et al, *Proceedings of SPIE* vol. 1585 Fiber Optic Gyros: 15th Anniversary Conference (1991) pp. 163-172.

*Primary Examiner*—Samuel A. Turner
*Attorney, Agent, or Firm*—John G. Shudy, Jr.

[57] ABSTRACT

An error reducer for reducing rotation rate errors, arising because of polarization modes coupling and differing polarization modes characteristics associated with a coiled optical fiber in a rotation sensor, by causing an electromagnetic wave source to direct electromagnetic waves propagating in one of said opposing directions to oscillate in frequency value between frequencies occurring in adjacent opposite polarization mode resonances of those waves.

19 Claims, 3 Drawing Sheets

RFOG ROTATION RATE ERROR REDUCER HAVING RESONATOR MODE SYMMETRIZATION

The present invention relates to fiber optic gyroscopes used for rotation sensing and, more particularly, to resonator fiber optic gyroscopes.

Fiber optic gyroscopes are an attractive means with which to sense rotation. They can be made quite small and still be constructed to withstand considerable mechanical shock, temperature change, and other environmental extremes. In the absence of moving parts, they can be nearly maintenance free, and they have the potential to become economical in cost. They can also be sensitive to low rotation rates that can be problem in other kinds of optical gyroscopes.

There are various forms of optical inertial rotation sensors which use the well known Sagnac effect to detect rotation about a pertinent axis thereof. These include active optical gyroscopes having the gain medium contained in an optical cavity therein, such as the ring laser gyroscope, and passive optical gyroscopes without any gain medium in the primary optical path, such as the interferometric fiber optic gyroscope (IFOG) and the ring resonator fiber optic gyroscope (RFOG). The avoidance of having the active medium along the primary optical path in the gyroscope eliminates some problems which are encountered in active gyroscopes such as low rotation rate lock-in, bias drift and some causes of scale factor variation.

Interferometric fiber optic gyroscopes typically employ a single spatial mode optical fiber of a substantial length formed into a coil, this substantial length of optical fiber being relatively costly. Resonator fiber optic gyroscopes, on the other hand, are constructed with relatively few turns of a single spatial mode optical fiber giving them the potential of being more economical than interferometric fiber optic gyroscopes. A resonator fiber optic gyroscope typically has three to fifty meters of optical fiber in its coil versus 100 to 2,000 meters of optical fiber in coils used in interferometric fiber optic gyroscopes. In addition, resonator fiber optic gyroscopes appear to have certain advantages in scale factor linearity and dynamic range.

In either type of passive gyroscope, these coils are part of a substantially closed optical path in which an electromagnetic wave, or light wave, is introduced and split into a pair of such waves, to propagate in opposite directions through the optical fiber coil to both ultimately impinge on a photodetector or photodetectors, a single photodetector for both waves in interferometric fiber optic gyroscopes and on corresponding ones of a pair of photodetectors in resonator fiber optic gyroscopes. Rotation about the sensing axis of the core of the coiled optical fiber in either direction provides an effective optical path length increase in one rotational direction and an effective optical path length decrease in the opposite rotational direction for one member of this pair of electromagnetic waves. The opposite result occurs for the remaining member of the pair of electromagnetic waves for such rotation. Such path length differences between the pair of electromagnetic waves introduce corresponding phase shifts between those waves in interferometric fiber optic gyroscopes, or corresponding different optical cavity effective optical path lengths for these waves in a resonator fiber optic gyroscope.

In this latter instance, one or more optical frequency shifters are used to each effectively adjust the frequency of a corresponding one of the pair of electromagnetic waves that circulate in opposite directions in the resonator fiber optic coil. This is accomplished through such a frequency shifter shifting the frequency of a corresponding input electromagnetic wave giving rise to the resonator electromagnetic wave of interest. As a result, through feedback arrangements, the frequencies of each member of the pair of electromagnetic waves can be kept in resonance with the effective optical path length that wave is experiencing in the resonator fiber optic coil. Hence, any frequency difference between these waves becomes a measure of the rotation rate experienced by the resonator fiber optic coil about the axis around which this coil has been positioned. In such resonances, each wave has the portions thereof that previously were introduced in the resonator coil and have not yet dissipated, and the portions thereof currently being introduced in the resonator coil, at a frequency such that they are all in phase with one another so they additively combine to provide a peak in the intensity of that wave in that resonator over a local range of frequencies.

The difference in frequency between the members of the pair of opposing electromagnetic waves in a resonant fiber optic gyroscope is desired to be constant when rotation conditions about the resonator optic fiber coil axis are unchanging thereby requiring that stable resonance conditions occur in that resonator in those circumstances. Furthermore, there are several advantages in achieving frequency shifting of the resonator electromagnetic waves by operating one or more integrated optics phase modulators for this purpose through each of which the corresponding input electromagnetic wave transmitted. These advantages involve economics, packaging volume, and performance. Obtaining a constant frequency difference between these resonator wave pair members using such a phase modulator requires that the phase modulator change phase in the form of a linear ramp since the derivative of phase with respect to time yields the frequency.

Because of the impossibility of having a phase modulator provide an infinite duration linear ramp with respect to time, a repetitive linear ramp with periodic resetting of the phase to a reference value must be used. The resulting sawtooth phase change waveform results in what is termed serrodyne phase modulation of those electromagnetic waves passing through the modulator.

Consider the known resonator fiber optical gyroscope system of FIG. 1. An optical cavity resonator, 10, formed by a continual path optical fiber is provided with an input directional coupler, and an output directional optical coupler, 12. Resonator 10 is formed of a single spatial mode optical fiber which has two polarization eigenstates. Avoiding different optical path lengths for electromagnetic waves in each state is initially solved by thoroughly mixing the polarized waves in each such state. Such mixing is achieved by fabricating the resonator coil with two ends of a three to fifty meter length of such fiber spliced together so that the birefringence principal axes of the fiber are rotated 90° with respect to each other on opposite sides of a splice, 13. The resonator fiber is characterized by a loss coefficient, $\alpha$, and, for such a splice, an average of the propagation constants with the principal birefringent axes as will be more fully described below. This initial solution to avoiding different optical path lengths for the two polarization components of an electromagnetic wave propagating in one direction in resonator coil 10 does not, however, completely avoid this source of error because of the further effects of couplings between polarization modes occurring in connection with resonator coil 10 as will be further described below. The nature of splice 13 is described in greater detail in U.S. Pat. No. 5,018,857 to Sanders et al, and is hereby incorporated herein by reference.

Directional coupler is fabricated by appropriately fusing together an input optical fiber, 14, with the optical fiber in resonator 10, the fibers being tapered as they come into the fused portion on either side of that portion. Directional coupler 11 provides a phase shift of $\pi/2$ between an input electromagnetic wave and the resulting electromagnetic wave at the resonator output thereof, the output wave further being characterized with respect to the input electromagnetic wave by a coupler coupling coefficient, $k_1$, and a coupler loss coefficient, $\gamma_1$. Directional coupler has a suitable packaging arrangement thereabout.

Directional coupler 12 is constructed in generally the same manner as is directional coupler 11, but here an output optical fiber, 15, is fused to the optical fiber of resonator 10. Directional coupler 12 is characterized, at least initially, by a coupler coupling coefficient, $k_2$, and a coupler loss coefficient, $\gamma_2$. Below, differential losses and couplings along the two principal birefringent axes therein are recognized since they are more significant for this coupler than for input coupler 11.

The opposite ends of input optical fiber 14 are each connected to an integrated optics chip, 16, formed with lithium niobate (LiNbO$_3$) as the base material therefor. These ends of fiber 14 are appropriately coupled to integrated optical waveguides, 17 and 18, formed in the base material of optical integrated circuit 16. The relationship of the ends of input optical fiber 14 and the ends of integrated waveguides 17 and 18 are such that electromagnetic waves can be efficiently passed therebetween without undue losses. Integrated waveguide 17 is provided between a pair of metal plates formed on the base material of optical integrated circuit 16 to provide a phase modulator, 19, therein. Similarly, integrated waveguide 18 is formed between a another pair of metal plates formed on the base material to result in a further phase modulator, 20, in optical integrated circuit 16. Integrated waveguides 17 and 18 merge with one another into a single integrated waveguide, 21, to thereby provide a "Y" coupler in optical integrated circuit 16.

A laser, 22, is coupled to integrated waveguide 21 in a suitable manner so that light may be transmitted efficiently from laser 22 to integrated waveguide 21. Laser 22 is typically a solid state laser emitting electromagnetic radiation having a wavelength of 1.3 $\mu$m with a spectral line width of one to hundreds of Khz. The wavelength at which laser 22 operates, or the frequency thereof, $f_o$, can be adjusted by signals at an input thereof. Typical ways of providing such adjustment is to control the temperature of, or the current through, the solid state laser, or through the "pumping" semiconductor light emitting diode for the solid state laser, which in the latter instance may be a Nd:Yag laser. Where the diode is the emitting laser, the laser type may be an external cavity laser, a distributed feedback laser or other suitable types. A further alternative for frequency changing the optical frequency of the laser emitted wave is to use a laser in which the resonant cavity length can be changed using electrooptic material built into that laser.

Thus, electromagnetic radiation emitted by laser 22 at a variable frequency $f_o$ is coupled to integrated waveguide 21, and from there split into two portions to form a pair of electromagnetic waves traveling in the input optical path in directions opposite one another. That is, the electromagnetic wave portion transmitted through integrated waveguide 17 proceeds therethrough and past phase modulator 19 into input optical fiber 14, and through input directional coupler 11 where a fraction $k_1$ is continually coupled into resonator 10 to repeatedly travel therearound in a first direction, the counterclockwise direction, there being a continual fractional loss for that wave of $\gamma_1$ in coupler as indicated above. The remaining portion of that wave, neither entering resonator 10 nor lost in coupler continues to travel along input optical fiber 14 into integrated optical waveguide 18, through phase modulator 20, and finally through integrated waveguide 21 returning toward laser 22. Usually, laser 22 contains an isolator to prevent such returning waves from reaching the lasing portion thereof so that its properties are unaffected by those returning waves.

Similarly, the electromagnetic wave portion from laser 22, entering integrated waveguide 21 to begin in integrated waveguide 18, passes through phase modulator 20 into input optical fiber 14 and input directional coupler 11 where a fraction $k_1$ thereof is continually coupled into resonator 10, accompanied by a continual fractional loss of $\gamma_1$, to repeatedly traverse resonator 10 in a direction opposite (clockwise) to that traversed by the first portion coupled into resonator 10 described above. The remaining portion not coupled into resonator 10, and not lost in directional coupler 11, continues through input optical fiber 14 into integrated waveguide 17, passing through phase modulator 19, to again travel in integrated waveguide 21 in the opposite direction on its return toward laser 22.

The pair of opposite direction traveling electromagnetic waves in resonator 10, a clockwise wave and a counterclockwise wave, each have a fraction $k_2$ continually coupled into output optical fiber 15 with a fraction $\gamma_2$ of each continually lost in coupler 12. The counterclockwise wave is transmitted by coupler 12 and fiber 15 to a corresponding photodetector, 23, and the clockwise wave is transmitted by them to a corresponding photodetector, 24, these photodetectors being positioned at opposite ends of output optical fiber 15. Photodetectors 23 and 24 are typically p-i-n photodiodes each of which is connected in corresponding one of a pair of bias and amplifying circuits, 25 and 26, respectively.

The frequency of the electromagnetic radiation emitted by laser 22, after being split from its combined form in integrated waveguide 21 into separate portions in integrated waveguides 17 and 18, has a resulting portion thereof shifted from frequency $f_o$ to a corresponding resonance frequency by a serrodyne waveform applied to phase modulator 19. The portion of the electromagnetic wave diverted into integrated waveguide 17 is shifted from frequency $f_o$ to frequency $f_o+f_1$ by phase modulator 19, and this frequency shifted electromagnetic wave is then coupled by input directional coupler 11 into resonator 10 as the counterclockwise electromagnetic wave. However, the portion of the electromagnetic wave directed into integrated waveguide 18 from integrated waveguide 21 is not shifted in frequency in the system of FIG. 1, although the frequency thereof could alternatively be similarly shifted from $f_o$ to $f_o+f_2$ by phase modulator 20 in forming the clockwise wave in coil 10. This arrangement would permit having to measure just differences in frequencies between the two serrodyne generators used in such an arrangement to obtain a system output signal rather than the absolute frequency value of a single generator which may be more convenient in some circumstances. The shifting of frequency of the wave in integrated waveguide 17 is caused by a serrodyne waveform applied to phase modulator 19 as indicated above, the serrodyne waveform for phase modulator 19 being supplied from a controlled serrodyne generator, 27. A similar serrodyne waveform would be applied to modulator 20 by a fixed frequency serrodyne generator if the wave in waveguide 18 was chosen to also be shifted in frequency.

Thus, controlled serrodyne generator 27 provides a sawtooth waveform output signal having a repetitive linear ramp variable frequency $f_1$, the frequency $f_1$ of this sawtooth waveform being controlled by an input shown on the upper side of generator 27 in FIG. 1. The repetitive linear ramp frequency of a sawtooth waveform from another serrodyne generator, if chosen as part of the control for modulator 20, would be fixed as indicated above, and held at a constant value, $f_2$.

Structural detail of controlled serrodyne generator 27 is shown within the dashed line box representing that generator in FIG. 1 as three further blocks. The frequency control input of generator 27 is the input of a voltage-to-frequency converter, 27'. The frequency of the output signal of converter 27', proportional to the voltage at its input, sets the rate of count accumulation in a counter, 27", to which the output of converter 27' is connected. The output count totals of counter 27" are provided to a digital-to-analog converter, 27''', to form a "staircase" waveform to approximate the linear "ramps" occurring in a true serrodyne waveform.

The clockwise electromagnetic wave in resonator 10 and the counterclockwise electromagnetic wave in resonator 10 must always have the frequencies thereof driven toward values causing these waves to be in resonance in resonator 10 for the effective optical path length each is experiencing. This includes the path length variation resulting from any rotation of resonator 10 about the symmetrical axis thereof that is substantially perpendicular to the plane of the loop forming that optical resonator. Since controlled serrodyne generator 27 has the frequency of its serrodyne waveform controlled externally, that frequency value can be adjusted to the point that the corresponding counterclockwise wave in resonator 10 is in resonance with its effective path length, at least in a steady state situation. There, of course, can be transient effects not reflecting resonance in situations of sufficiently rapid changes of rotation rates of resonator 10.

On the other hand, the absence of a sawtooth waveform from another serrodyne generator to form part of the control of modulator 20 as shown in FIG. 1, or the use of a constant frequency for the sawtooth waveform of another serrodyne generator alternatively chosen to form part of the control of modulator 20, requires that the clockwise electromagnetic wave in resonator 10 be adjusted by other means. The means chosen in FIG. 1 is adjusting the frequency value of the light in laser 22. Thus, the adjustment of the value of the frequency $f_1$ of the sawtooth waveform of controlled serrodyne generator 27 can be accomplished independently of the adjustment of the frequency $f_o$ of laser 22 so that, in steady state situations, both the counterclockwise electromagnetic wave and the clockwise electromagnetic wave in resonator 10 can be in resonance therein despite each experiencing a different effective optical path length therein.

Adjusting the frequency of the counter-clockwise and clockwise electromagnetic waves traveling in opposite directions in resonator 10 means adjusting the frequency of each of these waves so that they are operating at the center of one of the peaks in the corresponding intensity spectra for resonator 10 experienced by such waves. Maintaining the frequency of the counterclockwise and the clockwise waves at the center of a corresponding resonance peak in the corresponding one of the resonator intensity spectra would be a difficult matter if that peak had to be estimated directly without providing some additional indicator of just where the center of the resonance peak actually is. Thus, the system of FIG. 1 introduces a bias modulation with respect to each of the counterclockwise and clockwise waves in resonator 10 through phase modulators 19 and 20, respectively. Such a bias modulation of each of these waves is used in a corresponding feedback loop to provide a loop discriminant characteristic followed by a signal therein which is acted on by that loop to adjust frequency $f_o$ and $f_1$ as necessary to maintain resonance of the clockwise and counterclockwise waves, respectively. A bias modulation generator, 28, provides a sinusoidal signal at a frequency $f_m$ to directly control modulator 20. Similarly, a further bias modulation generator, 29, provides a sinusoidal waveform at a frequency $f_n$ which is added to the sawtooth waveform at frequency $f_1$ provided by serrodyne generator 27. Frequencies $f_m$ and $f_n$ differ from one another to reduce the effects of electromagnetic wave backscattering in the optical fiber of resonator 10. The sinusoidal signal provided by bias modulation generator 28 is supplied to a node, 30. The addition of the sinusoidal signal provided by bias modulation generator 29 to the sawtooth waveform provided by serrodyne wave generator 27 is accomplished in a summer, 31.

The sinusoidal waveform provided at node 30 is amplified in a power amplifier, 32, which is used to provide sufficient voltage to operate phase modulator 20. Similarly, the combined output signal provided by summer 31 is provided to the input of a further power amplifier, 33, used to provide sufficient voltage to operate phase modulator 19.

In this arrangement, the input electromagnetic wave to resonator 10 from integrated waveguide 17 will have an instantaneous electric field frequency of $$f_o + f_1 - f_n \Delta\phi_n \sin\omega_n t$$

where $\Delta\phi_n$ is the amplitude of the bias modulation phase change at frequency $f_n$. The fraction of the electromagnetic wave reaching photodetector 23 through resonator 10 is not only shifted in frequency to a value of $f_o+f_1$, but is also effectively frequency modulated at $f_n$. Depending on the difference between the resonance frequency and $f_o+f_1$, the intensity at that photodetector will thus have variations occurring therein at integer multiples of $f_n$ (though the fundamental and odd harmonics thereof will not occur at exact resonance). These latter components have amplitude factors related to the deviation occurring in the sum of (a) the phase shift resulting from the propagation constant multiplied by the path length in the counterclockwise direction in resonator 10, plus (b) phase shifts due to rotation and other sources, from a value equaling an integer multiple of $2\pi$, a condition necessary for resonance along the effective optical path length in this direction.

The electromagnetic wave in integrated waveguide 18 enroute to resonator 10 will have instantaneous frequency equal to $$f_o - f_m \Delta\phi_m \sin\omega_m t,$$

Here, $\Delta\phi_m$ is the amplitude of the bias modulation phase change at frequency $f_m$. The fraction thereof reaching photodetector 24 through resonator 10 is at a frequency value in this instance of $f_o$ and frequency modulated at $f_m$.

Again, the intensity at photodetector 24 will have variations therein at integer multiples of $f_m$, though not at the fundamental and odd harmonics thereof if these clockwise waves are at exact resonance. These latter components also have amplitude factors related to the deviation of the sum of (a) the phase shift resulting from the propagation constant multiplied by the path length in the clockwise direction in resonator 10, plus (b) phase shifts due to rotation and other sources, from a value equaling an integer multiple of $2\pi$, again, a condition necessary for resonance along the effective optical path length in that direction.

Since the output signal of photodetector 24 has a frequency component at $f_m$ that is a measure of the deviation from resonance in resonator 10 in the clockwise direction, the output signal of bias and amplifier photodetector circuit 26 is provided to a filter, 34, capable of passing signal portions having a frequency component $f_m$. Similarly, the output signal of photodetector 23 has a frequency component at $f_n$ that is a measure of the deviation from resonance in the counterclockwise direction, and so a filter, 35, is provided at the output of photodetector bias and amplifier circuit 25 capable of passing signal components having a frequency of $f_n$.

The output signal from filter 34 is then provided to a phase detector, 36, at an operating signal input thereof. Phase detector 36 is a phase sensitive detector which also receives, at a demodulation signal input thereof, the output signal of bias modulation generator 28 which is the sinusoidal signal at frequency $f_m$. Similarly, the output signal from filter 35 is provided to an operating signal input of a further phase detector, 37, which also receives at a demodulation input thereof the output sinusoidal signal at frequency $f_n$ of bias modulation generator 29. The output signals of phase detectors 36 and 37 follow a loop discriminant characteristic so that they indicate how far from resonance are the corresponding frequencies in resonator 10.

The discriminant characteristic followed by the output of phase detectors 36 and 37 will change algebraic sign for the frequencies on either side of the resonance peak and will have a zero magnitude at the resonance peak or resonance center. In fact, for sufficiently small values of the bias modulation generator output signals, the characteristic followed by the output signals of phase detectors 36 and 37 will be close to the derivative with respect to frequency of the intensity spectrum near the corresponding resonance peak. Thus, the output characteristics followed by the output signals of phase detectors 36 and 37 provide signals well suited for a feedback loop used to adjust frequencies to keep the corresponding electromagnetic waves in resonance in resonator 10.

Errors in the feedback loop are to be eliminated, and so the output signal of phase detector 36 is supplied to an integrator, 38, and the output signal of phase detector 37 is supplied to a further integrator, 39. Deviations from resonance are stored in these integrators which are then used in the loop to force the waves back to resonance in resonator 10. The output signal of integrator 38, in turn, is supplied to an amplifier, 40, used to provide signals to laser 22 to control the frequency $f_o$ of light being emitted by laser 22, thereby closing the feedback loop for adjusting that frequency. Similarly, the output signal of integrator 39 is supplied to an amplifier, 41, which in turn has its outputs supplied to the modulation input of controlled serrodyne generator 27, thus completing the remaining feedback loop to be used for adjusting serrodyne frequency $f_1$.

Returning to the use of splice 13 in the optical fiber of resonator coil 10, the absence of such a splice, resulting in no planned coupling of electromagnetic waves between the two polarization modes in the fiber, leads to substantial output errors because couplings of such waves between these modes still occur even with the use of polarization maintaining fiber. Although such polarization maintaining fiber preserves isolation between the polarization modes quite well absent other sources of coupling being introduced therewith, such outside sources of coupling are unavoidable if electromagnetic waves are to be coupled both into resonator coil 10 and out of resonator coil 10. That is, use of directional couplers 11 and 12 unavoidably leads to coupling of electromagnetic waves between polarization modes even if the electromagnetic waves provided to the input of coupler 11 for such coupling are in a single polarization mode.

As a result, there can be two different optical paths followed by the two polarization portions of the electromagnetic waves propagating in each direction around resonator coil 10, both the clockwise and the counterclockwise directions, a situation which leads to pairs of adjacent resonance modes for both the clockwise and counterclockwise waves. In other words, there will be two orthogonally polarized light waves traveling in the clockwise direction and two orthogonally polarized light waves traveling in the counterclockwise direction with the two orthogonally polarized light waves in either direction each following a corresponding optical path with characteristics differing from that of the other.

Such differing characteristics occur at least for the reason that the corresponding and differing indices of refraction for those paths lead to different speeds around resonator coil 10 for each of such a pair of orthogonally polarized electromagnetic waves traveling in one of the directions therearound. Hence, each of the orthogonally polarized electromagnetic waves traveling in one of the directions around resonator coil 10 will have a corresponding resonant frequency differing from that of the other thereby leading to the occurrence of a pair of adjacent resonances with differing, but relatively close, resonant frequencies. Further, since these two orthogonally polarized waves traveling in one of the directions around coil 10 were not excited equally at the initiation thereof, the resonance peaks for each will be of differing values.

In addition, the frequency separation between the adjacent pairs of resonances for a pair of orthogonally polarized electromagnetic waves propagating in one of the directions around resonator coil 10 will change rapidly as the birefringence changes with temperature. Thus, the resonance due to the polarized electromagnetic wave undesirably introduced by the excitation of the desired polarization electromagnetic wave will drift with respect to the resonance of the desired wave with temperature changes. In fact, in a typical polarization maintaining optical fiber for resonator coil 10, the two corresponding resonance frequencies will actually coincide and then cross each other for every 1° C. of temperature change. In those instances in which the two resonances are in relatively close proximity, the line shape of each begins to meld with the other introducing significant asymmetries in the resonance line shapes effective for each. This results in relatively large errors in the output signal formed by the difference in frequency between the clockwise and counterclockwise electromagnetic waves because the bias modulation system for a wave experiencing such asymmetries becomes unable to determine where the actual frequency of the resonance center is located.

A substantial improvement in this situation, or an initial solution to avoiding such errors, is described in the above-references U.S. Pat. No. 5,018,857 to Sanders et al where the benefits of introducing splice 13 are described. That is, a 90° rotation between the principle birefringence axes on either side of splice 13 in the polarization maintaining optical fiber of resonator coil 10 provides a temperature independent frequency separation between the two resonant polarization eigenstates, the electromagnetic waves in each state propagating with equal amplitudes along the principal birefringence axes of this optical fiber assuming no adverse coupler effects. The two polarization resonance modes are separated by half a free spectral range (the frequency difference separating two successive resonances of waves in the same polarization state), and the temperature caused changes in the birefringence of the fibers are common to both modes so that lineshape melding phenomena do not occur.

On the other hand, exact 90° rotations of the principal birefringent axes on either side of splice 13 cannot in practice be made, nor can the coupling between modes in directional couplers 11 and 12 be eliminated even for electromagnetic waves merely passing through the resonator side of such couplers without being coupled to a port on the opposite side of the coupler. Thus, in a typical situation for resonator coil 10, the frequency separation between the resonances for the orthogonally polarized electromagnetic waves propagating in either of the directions about resonator coil 10 will oscillate with relatively small amplitude about the half free spectral range nominally separating them as the temperature of resonator coil 10 is varied. Though the resonances will remain separated as desired, they will nevertheless cause relatively small asymmetries one in the other, and which can be asymmetries sufficient to cause significant errors at least in higher performance resonator fiber optic gyroscopes as is shown in the following analysis for the system of FIG. 1.

Although an analysis based on a scalar function is usually sufficient for describing electromagnetic waves in the optical system of FIG. 1, a vectorial analysis must be used here because of the wave polarization being the subject of the analysis which involves the position of the tip of the electric field vector at various cross sections of resonator coil 10 along its length. In particular, the electric fields of the orthogonal polarization components of the clockwise and counterclockwise electromagnetic waves are desired at a point in resonator 10 in which they are coupled by directional coupler 12 into output optical fiber 15 so the effect thereof on the corresponding one of photodetectors 23 and 24 can be determined. To avoid the introduction of unnecessary details, each of couplers 11 and 12 are assumed to have no length along resonator coil 10 and to have lumped characteristics rather than distributed characteristics for this purpose. Thus, there is a single point of entrance of the electromagnetic waves into resonator coil 10 which have been coupled thereto through directional coupler 11, and a single point of exit from resonator 10 of the electromagnetic waves being coupled out to output optical fiber 15 by directional coupler 12.

Furthermore, although electromagnetic waves passing through optical integrated chip 16 on the way to input directional coupler 11 may be polarized in chip 16, there will inevitably be some coupling of electromagnetic waves from the favored polarization mode into the other at the splice between input optical fiber 14 and integrated optics chip 16. For purposes of the analysis, such coupling will be considered negligible compared with the coupling introduced by input directional coupler 11.

The length of optical fiber in resonator coil 10 between the exit point for electromagnetic waves leaving for output fiber 15 in input directional coupler 12 to splice 13 will be designated $l_1$, the length of optical fiber between splice 13 and the entrance point for electromagnetic waves being coupled in from input fiber 14 in input directional coupler 11 is designated $l_2$, and the length between the entrance point in input directional coupler and the exit point in output directional coupler 12 avoiding splice 13 will be designated $l_3$. The angle between the birefringent axes on either side of splice 13 redesignated $\theta_{13}$, and is equal to $\theta_{13} = 90° - \epsilon = \pi/2 - \epsilon$ where $\epsilon$ represents the deviation from the desired angle of 90° for $\theta_{13}$. Vector symbols will be designated with an arrow thereover or will be written, as convenient, as row or column matrices.

Thus, the resonator counterclockwise electromagnetic wave at output directional coupler 12, $\vec{E}_{ccw-12}$, can be written $$\begin{aligned}E_{ccw-12} &= F(l_1)S(\theta_{13})F(l_2)T_{11-c}E_{i-11} + \\ &\quad F(l_1)S(\theta_{13})F(l_2)AT_{11-c}E_{i-11} + \\ &\quad F(l_1)S(\theta_{13})F(l_2)AAT_{11-c}E_{i-11} + \ldots \\ &= F(l_1)S(\theta_{13})F(l_2)\left[\sum_{n=o}^{\infty} A^n\right]T_{11-c}E_{i-11}.\end{aligned}$$

Here, $E_{i-11}$, represents the input electromagnetic waves in optical fiber 14 being provided to input directional coupler 11 for partial insertion into resonator coil 10. The first term in the first of the foregoing equations represents the effects on $\vec{E}_{i-11}$ in reaching the exit point in output directional coupler 12 after insertion at the entrance point in input directional coupler 11, and the remaining terms represent the effects of successive round trips through resonator 10 on that electromagnetic wave so introduced as this input electromagnetic wave is assumed to be constantly supplied by laser 22 through input waveguide 21 and through the "Y" coupler to phase modulator 19 and then to input directional coupler through input optical fiber 14. In each of these terms, are several matrix operators representing a corresponding part of the effects on this input electromagnetic wave due to the optical path characteristics, the operator A representing the cumulative effects on that wave occurring during an entire, single trip through resonator coil 10 beginning at the entrance point in coupler 11.

Prior to starting such a round trip, an electromagnetic wave being inserted into resonator coil 10 from input fiber 14 at input directional coupler 11 first encounters the transmissive coupling nature of this coupler, represented by matrix operation $T_{11-c}$, insofar as its coupling characteristics from input optical fiber 14 to the entrance point to begin propagation in the counterclockwise direction in resonator coil 10. That is, rather than representing input directional coupler 11 by its full 4×4 matrix, a 2×2 matrix is used here to represent its coupling characteristics, that matrix for this operator being $$T_{11-c} \overset{\Delta}{=} i\sqrt{k_1} \sqrt{1-\gamma_1} \begin{bmatrix} \cos\theta_{11} & -\sin\theta_{11} \\ \sin\theta_{11} & \cos\theta_{11} \end{bmatrix}.$$

In this operator matrix, i is the imaginary number symbol, or $$i \overset{\Delta}{=} \sqrt{-1},$$

and $k_1$ is the coupling constant with $\gamma_1$ being the loss constant as given above. Here, losses and coupling efficiency over each principal birefringent axis are considered identical since there is so little of the electromagnetic wave coupled into the unfavored axis after the polarization provided by chip 16 with respect to the favored axis of fiber 14 aligned therewith that any such differences are expected to have a negligible effect.

The constant $\theta_{11}$ represents the effective angular misalignment of the input principal birefringent axis of input optical fiber 14 and that same axis of the optical fiber in resonant coil 10. Lumped parameter $\theta_{11}$ also accounts for other coupling between the polarization modes in input directional coupler 11 due to stress on the fibers therein. As can be seen, the parameter $\theta_{11}$, being other than zero, contributes to a diminution in the waves coupled from one principal birefringent axis in input optical fiber 14 to the corresponding principal birefringent axis in the optical fiber of coil 10, and contributes to the addition of an electromagnetic wave portion to the principal birefringent axis orthogonal thereto in the optical fiber of resonator coil 10.

The input electromagnetic waves, $T_{11-c}\vec{E}_{i-11}$, then first encounter a length of optical fiber $l_2$ in propagating through resonator coil 10. This length of optical fiber is represented by a matrix operator, $F(l_2)$, as $$F(l_2) \overset{\Delta}{=} e^{-\alpha\frac{l_2}{2}} \begin{bmatrix} e^{-i\beta_{o-1,x}l_2} & 0 \\ 0 & e^{-\beta_{o-1,y}l_2} \end{bmatrix}.$$

The fiber loss constant, $\alpha$, is the optical loss per unit length in the optical fiber. As can be seen, the polarization maintaining fiber is assumed to provide no coupling locations itself so that the off-diagonal terms in this last matrix, or the cross-coupling terms, are set to zero. The diagonal terms represent the phase changes due to propagation along the orthogonal principal birefringent axes in the optical fiber as represented by the propagation "constants" corresponding to each. These principal birefringent axes are designated as the "x" axis and the "y" axis, each having a corresponding propagation constant therealong, $\beta_{o-1,x}$ and $\beta_{o-1,y}$, respectively.

Next enroute to the exit point, the electromagnetic wave encounters splice 13 which again is represented by a matrix operator, $S(\theta_{13})$, as $$S(\theta_{13}) \overset{\Delta}{=} \sqrt{1-\gamma_3} \begin{bmatrix} \cos\theta_{13} & -\sin\theta_{13} \\ \sin\theta_{13} & \cos\theta_{13} \end{bmatrix}.$$

In this representation, $\gamma_3$ is the loss at splice 13 due to reflection, scattering, etc. Once again, misalignment in $\theta_{13}$ (by an amount $\epsilon$ as given above) leads to a diminution in the coupling from one principal birefringent axis to the counterpart 90° rotated axis that it was intended to be aligned with across splice 13, and an introduction of some of the electromagnetic wave into the other, unintended, orthogonal principal birefringent axis across that splice.

Lastly, before reaching the exit point, an electromagnetic wave propagating from the entrance point in input coupler 11 encounters an optical fiber segment of length $l_1$ between splice 13 and output directional coupler 12 represented by the matrix operator $F(l_1)$. The same operator form is used here as was used in connection with the length $l_2$, as described above, changed only to reflect the possible differences in lengths of optical fiber in these two fiber segments, or $$F(l_1) \overset{\Delta}{=} e^{-\alpha\frac{l_1}{2}} \begin{bmatrix} e^{-i\beta_{o-1,x}l_1} & 0 \\ 0 & e^{-i\beta_{o-1,y}l_1} \end{bmatrix}.$$

Parameters appearing in this last matrix corresponding to those used in the matrix operator associated with length $l_2$ have similar descriptions.

Round trip matrix operator A is further composed of several matrix operators similarly representing the various portions of resonator 10, this representation being $$A \overset{\Delta}{=} T_{11-s}F(l_3)T_{12-s}F(l_1)S(\theta_{13})F(l_2).$$

This last equation introduces three further matrix operators, one of those, $F(l_3)$, representing the effects of the optical fiber having length $l_3$ located between the exit point in output directional coupler 12 and the entrance point in input directional coupler 11. Again, the same form is used for the matrix operator representing this optical fiber portion as was used for the matrix operators representing the other two optical fiber portions of resonator coil 10 with appropriate substitutions for the different lengths involved, or $$F(l_3) \overset{\Delta}{=} e^{-\alpha\frac{l_3}{2}} \begin{bmatrix} e^{-i\beta_{o-1,x}l_3} & 0 \\ 0 & e^{-\beta_{o-1,y}l_3} \end{bmatrix}.$$

Again, parameters appearing in this last matrix corresponding to those used in the matrix operators associated with lengths $l_1$ and $l_2$ have descriptions similar to those previously described parameters.

The remaining two newly introduced matrix operators each represent the transmissive pass-through nature of the input and output directional couplers. The operator $T_{11-s}$ represents the effects of input directional coupler 11 on those electromagnetic waves in resonator coil 10 propagating straight through that coupler without being coupled to input fiber 14, and the operator $T_{12-s}$ represents the effects of output directional coupler 12 on those electromagnetic waves in resonator 10 passing straight through that coupler without any coupling to output optic fiber 15. These two matrix operators are for present purposes written as $$T_{11-s} \triangleq \sqrt{(1-k_1)(1-\gamma_1)} \begin{bmatrix} \cos\theta_{11}' & -\sin\theta_{11}' \\ \sin\theta_{11}' & \cos\theta_{11}' \end{bmatrix},$$

$$T_{12-s} \triangleq \sqrt{(1-k_2)(1-\gamma_2)} \begin{bmatrix} \cos\theta_{12}' & -\sin\theta_{12}' \\ \sin\theta_{12}' & \cos\theta_{12}' \end{bmatrix}.$$

The coupling constants, $k_1$ and $k_2$, and the loss constants, $\gamma_1$ and $\gamma_2$, for input directional coupler 11 and output directional coupler 12, respectively, have been defined above. Losses and coupling efficiency over each principal birefringent axis are considered identical in each operator as any differences are expected to have a negligible effect, although there remains the possibility there will be some effects due to differential losses and differential couplings depending on the magnitude of the differences.

The angle parameters $\theta_{11}'$ and $\theta_{12}'$ again represent the effects of fused coupling to the extent they have a value greater than zero because of stress being introduced, and the like. That is, such effective angles can be viewed as the results of distortion in the principal birefringent axes of the coupler portions of the optical fiber in resonator coil 10 due to the stresses induced in the fusing of that fiber to the input optical fiber 14 and output fiber 15, or may be viewed as a convenient "lumped" parameter to provide the coupling effects on electromagnetic waves traveling through the couplers as "effective angles" in a convenient representation for such coupler effects. In such circumstances, there will be a diminution in the transfer of the electromagnetic waves along the polarization mode axes from the entrance by the waves in the coupler on the resonator coil 10 side thereof to the exit from the coupler of those waves on the resonator coil 10 side thereof.

With these definitions, or characterizations, of the optical path components encountered during a round trip by counterclockwise propagating electromagnetic waves through the optical fiber in resonator coil 10, the round trip matrix operator A can, after the matrix multiplication of the matrix operators in the definition thereof, be written in combined form as $$A = Re^{-i(\beta_{ccw}L - \theta_r)} \begin{bmatrix} \cos\theta_{13}\cos\theta_{11}'\cos\theta_{12}'e^{i\delta} & -\cos\theta_{13}\sin\theta_{11}'\cos\theta_{12}'e^{-i\delta} \\ -\sin\theta_{13}\cos\theta_{11}'\sin\theta_{12}'e^{i\sigma} & +\sin\theta_{13}\sin\theta_{11}'\sin\theta_{12}'e^{-i\sigma} \\ -\cos\theta_{13}\sin\theta_{11}'\sin\theta_{12}'e^{i\eta} & -\cos\theta_{13}\cos\theta_{11}'\sin\theta_{12}'e^{-i\eta} \\ -\sin\theta_{13}\sin\theta_{11}'\cos\theta_{12}'e^{i\zeta} & -\sin\theta_{13}\cos\theta_{11}'\cos\theta_{12}'e^{-i\zeta} \\ \cos\theta_{13}\sin\theta_{11}'\cos\theta_{12}'e^{i\delta} & \cos\theta_{13}\cos\theta_{11}'\cos\theta_{12}'e^{-i\delta} \\ -\sin\theta_{13}\sin\theta_{11}'\sin\theta_{12}'e^{i\sigma} & -\sin\theta_{13}\cos\theta_{11}'\sin\theta_{12}'e^{-i\sigma} \\ +\cos\theta_{13}\cos\theta_{11}'\sin\theta_{12}'e^{i\eta} & -\cos\theta_{13}\sin\theta_{11}'\sin\theta_{12}'e^{-i\eta} \\ +\sin\theta_{13}\cos\theta_{11}'\cos\theta_{12}'e^{i\zeta} & -\sin\theta_{13}\sin\theta_{11}'\cos\theta_{12}'e^{-i\zeta} \end{bmatrix}$$

where $$L \triangleq l_1 + l_2 + l_3, \; R \triangleq$$

$$\sqrt{(1-k_1)(1-\gamma_1)} \; \sqrt{(1-k_2)(1-\gamma_2)} \; \sqrt{(1-\gamma_3)} \; e^{-\alpha\frac{L}{2}}.$$

The constant, R, results from the multiplication of the various matrix operators in the definition of A. An additional term which would not result from such multiplication of those operators appears in the argument of the exponential following this constant in the equation for A. This additional term has been added to represent the results of propagation about the loop with a rotation of that loop about an axis leading to a Sagnac phase shift of $\phi_r$ induced by that rotation.

The effect of the propagation "constant" in the foregoing equation, $\beta_{ccw}$, is to provide the effective phase change per unit length along the optical fiber in resonator coil 10, and comprises a pair of terms, that is $\beta_{ccw} = (\beta_{o-1,x} + \beta_{o-1,y})/2 + \Delta\beta_n \sin\omega_n t$. The term $(\beta_{o-1,x} + \beta_{o-1,y})/2 = 2\pi(f_o + f_1)(n_{o-1,x} + n_{o-1,y})/2c$ is the weighted average of the propagation "constants" of the two principal axes of birefringence of the optical fiber in resonator coil 10. The parameter $\Delta\beta_n = 2\pi f_n \Delta\phi_n (n_{o-1,x} + n_{o-1,y})/2c$ is the equivalent change in the effective propagation constant due to the incoming electromagnetic waves having been modulated sinusoidally at the rate $\omega_n$ with a peak amplitude change of $\Delta\phi_n$. Of course, $\omega_o + \omega_1 = 2\pi(f_o + f_1)$, is the frequency of oscillation in the electromagnetic wave provided by laser 22 after being shifted in frequency by controlled serrodyne generator 27.

Further definitions are involved in this last matrix equation, these being as follows:

$$\delta \triangleq \Delta\beta_{ccw}(l_1 + l_2 + l_3)$$
$$\sigma \triangleq \Delta\beta_{ccw}(-l_1 + l_2 + l_3)$$
$$\eta \triangleq \Delta\beta_{ccw}(l_1 + l_2 - l_3)$$
$$\zeta \triangleq \Delta\beta_{ccw}(-l_1 + l_2 - l_3)$$

The parameter $\Delta\beta_{ccw}$ is the birefringence along an optical fiber, and is defined as $$\Delta\beta_{ccw} \triangleq \frac{\beta_{o-1,x} - \beta_{o-1,y}}{2}.$$

Input electromagnetic field $\bar{E}_{i-11}$ is, as stated above, the electromagnetic wave at the entrance point in input directional coupler 11, and is generally written in matrix form as $$E_{i-11} = \begin{bmatrix} E_{i-11,x} \\ E_{i-11,y} \end{bmatrix}.$$

Here, $E_{i-11,x}$ represents the electromagnetic wave portion provided along one principal birefringent axis of input optical fiber 14, and $E_{i-11,y}$ represents the input field along the orthogonal principal birefringent axis of that fiber.

Input laser 22 emits an electromagnetic field of magnitude $E_i$ in the polarization mode passed in the waveguides in integrated optic chip 16. That electromagnetic wave is split at the "Y" coupler after input waveguide 21 with a fraction $pE_i$ passing into integrated waveguide 17, through phase modulator 19, and into input optical fiber 14 to reach input directional coupler 11, where p represents the split at coupler 21 and the accumulated losses in reaching coupler 11. Similarly, a fraction $qE_i$ reaches coupler 11 after being split at coupler 21 and passed through integrated waveguide 18 and phase modulator 20 to then propagate in input optical fiber 14.

As stated above, the portion of electromagnetic wave of amplitude $pE_i$ which reaches that principal birefringent axis of input optical fiber 14 not intended to be aligned with the electric field of the polarized electromagnetic wave passed by integrated optic chip 16 is small. This wrong axis propagation occurs because of the small rotational misalignment between the principal birefringent axis of input optical fiber 14 intended to be aligned to receive the polarized electromagnetic wave passed by integrated optic chip 16. As also stated above, this small coupling to the principal birefringent axis of input optical fiber 14 will be small compared to the parameter $\theta_{11}$ of the coupling matrix operator representing input optical coupler 11 and will be neglected without significant loss in generality, and so the input electromagnetic field from input optical fiber 14 will be specifically written as $$E_{i-11} = pE_i \begin{bmatrix} 1 \\ 0 \end{bmatrix}.$$

This assumes that the input axis of input optical fiber 14 favored by the polarization state passed by chip 16 is the "x" axis of optical input fiber 14 which is intended to be parallel to the "x" axis of the optical fiber in resonator 10 through being closely aligned therewith in the fusing process forming input directional coupler 11.

In effect, round trip matrix operation A represents the effects of propagation of the counterclockwise electromagnetic waves in resonator coil 10, and the counterclockwise waves having the characteristics resulting from these effects are kept at resonance by controlled serrodyne generator 27. If this resonance result is to occur, the counterclockwise electromagnetic waves must in effect be a vectorial reproduction of themselves at any point in resonator coil 10 after one round trip except for amplitude differences and phase differences (only multiples of $2\pi$ permitted for resonance) due to the effects thereon from such propagation if a resonance condition is to occur.

That is, the vectors representing a returning electromagnetic wave must parallel those of the departing wave at each point in the resonator (ignoring transients) to remain in the fiber at any point in resonator coil 10 and satisfy the well known condition for resonance in that coil, but the amplitude and phase of the wave will have been changed by its return (phase change being a multiple of $2\pi$) to the point of interest from what they were in the wave at its last leaving from that point of interest. Hence, an electric field subject to matrix operator A at the entrance point in input directional coupler 11 must be able to be represented by a pair of vector components which are eigenvectors for matrix operator A. That is, there must be a pair of eigenvectors $\vec{u}_1, \vec{u}_2$ which satisfy $$A\vec{u}_1 = \lambda_1\vec{u}_1, \quad A\vec{u}_2 = \lambda_2\vec{u}_2.$$

The eigenvalues, $\lambda_1$ and $\lambda_2$, of A represent the attenuation and phase change of the modes of that matrix operator represented by its eigenvectors.

These eigenvectors and eigenvalues can be determined in the usual manner by finding the determinant of matrix operator A minus $\lambda$ times the identity matrix, that is the roots of the characteristic equation for A. Eigenvalues, once so found, are then substituted in the equations above to find the eigenvectors. The result is as follows:

$$\lambda_1 = Re^{-i(\beta_{ccw}L-\theta r)}\{-(-\cos\theta_{13}\cos\theta_{11}'\cos\theta_{12}'\cos\delta +$$

$$\sin\theta_{13}\cos\theta_{11}'\sin\theta_{12}'\cos\sigma + \cos\theta_{13}\sin\theta_{11}'\sin\theta_{12}'\cos\eta +$$

$$\sin\theta_{13}\sin\theta_{11}'\cos\theta_{12}'\cos\zeta) + i[1 - (-\cos\theta_{13}\cos\theta_{11}'\cos\theta_{12}'\cos\delta +$$

$$\sin\theta_{13}\cos\theta_{11}'\sin\theta_{12}'\cos\sigma + \cos\theta_{13}\sin\theta_{11}'\sin\theta_{12}'\cos\eta +$$

$$\sin\theta_{13}\sin\theta_{11}'\cos\theta_{12}'\cos\zeta)^2]^{\frac{1}{2}}\}$$

$$\lambda_2 = Re^{-i(\beta_{ccw}L-\theta r)}\{-(-\cos\theta_{13}\cos\theta_{11}'\cos\theta_{12}'\cos\delta +$$

$$\sin\theta_{13}\cos\theta_{11}'\sin\theta_{12}'\cos\sigma + \cos\theta_{13}\sin\theta_{11}'\sin\theta_{12}'\cos\eta +$$

$$\sin\theta_{13}\sin\theta_{11}'\cos\theta_{12}'\cos\zeta) - i[1 - (-\cos\theta_{13}\cos\theta_{11}'\cos\theta_{12}'\cos\delta +$$

$$\sin\theta_{13}\cos\theta_{11}'\sin\theta_{12}'\cos\sigma + \cos\theta_{13}\sin\theta_{11}'\sin\theta_{12}'\cos\eta +$$

$$\sin\theta_{13}\sin\theta_{11}'\cos\theta_{12}'\cos\zeta)^2]^{\frac{1}{2}}\}$$

$$[u_1] = \begin{bmatrix} -\cos\theta_{13}\cos\theta_{11}'\cos\theta_{12}'\sin\delta \\ +\sin\theta_{13}\cos\theta_{11}'\sin\theta_{12}'\sin\sigma \\ +\cos\theta_{13}\sin\theta_{11}'\sin\theta_{12}\sin\eta \\ +\sin\theta_{13}\sin\theta_{11}'\cos\theta_{12}'\sin\zeta \\ -[1 - (-\cos\theta_{13}\cos\theta_{11}'\cos\theta_{12}'\cos\delta \\ \quad +\sin\theta_{13}\cos\theta_{11}'\sin\theta_{12}'\cos\sigma \\ \quad +\cos\theta_{13}\sin\theta_{11}'\sin\theta_{12}'\cos\eta \\ \quad +\sin\theta_{13}\sin\theta_{11}'\cos\theta_{12}'\cos\zeta)^2]^{\frac{1}{2}} \\ i(\cos\theta_{13}\sin\theta_{11}'\cos\theta_{12}'e^{i\delta} \\ \quad -\sin\theta_{13}\sin\theta_{11}'\sin\theta_{12}'e^{i\sigma} \\ \quad +\cos\theta_{13}\cos\theta_{11}'\sin\theta_{12}'e^{i\eta} \\ \quad +\sin\theta_{13}\cos\theta_{11}'\cos\theta_{12}'e^{i\zeta}) \end{bmatrix}$$

-continued $$[u_2] = \begin{bmatrix} -\cos\theta_{13}\cos\theta_{11}'\cos\theta_{12}'\sin\delta \\ +\sin\theta_{13}\cos\theta_{11}'\sin\theta_{12}'\sin\sigma \\ +\cos\theta_{13}\sin\theta_{11}'\sin\theta_{12}\sin\eta \\ +\sin\theta_{13}\sin\theta_{11}'\cos\theta_{12}'\sin\zeta \\ +[1 - (-\cos\theta_{13}\cos\theta_{11}'\cos\theta_{12}'\cos\delta \\ \quad +\sin\theta_{13}\cos\theta_{11}'\sin\theta_{12}'\cos\sigma \\ \quad +\cos\theta_{13}\sin\theta_{11}'\sin\theta_{12}'\cos\eta \\ \quad +\sin\theta_{13}\sin\theta_{11}'\cos\theta_{12}'\cos\zeta)^2]^{\frac{1}{2}} \\ i(\cos\theta_{13}\sin\theta_{11}'\cos\theta_{12}'e^{i\delta} \\ \quad -\sin\theta_{13}\sin\theta_{11}'\sin\theta_{12}'e^{i\sigma} \\ \quad +\cos\theta_{13}\cos\theta_{11}'\sin\theta_{12}'e^{i\eta} \\ \quad +\sin\theta_{13}\cos\theta_{11}'\cos\theta_{12}'e^{i\zeta}) \end{bmatrix}$$

These equations can be simplified in the situation where the rotational misalignments from the desired alignments are small, the usual situation in well-manufactured optical fiber gyroscopes. Thus, $\theta_{13}\pi/2-\epsilon$ can be shown through trigonometric identities to have the following sine and cosine thereof for $\epsilon$ being sufficiently small $$\sin\theta_{13} = \sin\frac{\pi}{2}\cos\epsilon + \cos\frac{\pi}{2}\sin\epsilon \approx 1,$$

9

$$\cos\theta_{13} = \cos\frac{\pi}{2}\cos\epsilon - \sin\frac{\pi}{2}\sin\epsilon \approx -\sin\epsilon \approx -\epsilon.$$

Similarly, for $\theta_{11}'$ sufficiently small, and for $\theta_{12}'$ also sufficiently small, $$\sin\theta'_{11}\approx\theta'_{11}, \cos\theta'_{11}\approx 1; \sin\theta'_{12}\approx\theta'_{12}, \cos\theta'_{12}\approx 1.$$

Of course, products of small terms will also be eliminated in future approximations.

Using these appropriate approximations, the preceding equations can be simplified to the following:

$$\lambda_1 \approx Re^{-i(\beta_{ccw}L-\theta r)}\{-(\theta_{12}'\cos\sigma + \theta_{11}'\cos\zeta + \epsilon\cos\delta) + i\}$$
$$= Re^{-i(\beta_{ccw}L-\theta r)}e^{i[\frac{\pi}{2} + (\theta_{13}-\frac{\pi}{2})\cos\delta+\theta_{11}'\cos\zeta+\theta_{12}'\cos\sigma]}$$

$$\lambda_2 \approx Re^{-i(\beta_{ccw}L-\theta r)}\{-(\theta_{12}'\cos\sigma + \theta_{11}'\cos\zeta + \epsilon\cos\delta) - i\}$$
$$= Re^{-i(\beta_{ccw}L-\theta r)}e^{-i[\frac{\pi}{2} + (\theta_{13}-\frac{\pi}{2})\cos\delta+\theta_{11}'\cos\zeta+\theta_{12}'\cos\sigma]}$$

$$[u_1] = \frac{1}{\sqrt{2}(1 + \epsilon\sin\delta + \theta_{11}'\sin\zeta + \theta_{12}'\sin\sigma)^{\frac{1}{2}}}\begin{bmatrix} 1 \\ \dfrac{e^{i(\zeta-\frac{\pi}{2})}}{1 - \epsilon\sin\delta - \theta_{11}'\sin\zeta - \theta_{12}'\sin\sigma} \end{bmatrix}$$

$$[u_2] = \frac{1}{\sqrt{2}(1 - \epsilon\sin\delta - \theta_{11}'\sin\zeta - \theta_{12}'\sin\sigma)^{\frac{1}{2}}}\begin{bmatrix} 1 \\ \dfrac{e^{i(\zeta+\frac{\pi}{2})}}{1 + \epsilon\sin\delta + \theta_{11}'\sin\zeta + \theta_{12}'\sin\sigma} \end{bmatrix}$$

These simplified eigenvectors have been written in normalized form, and can be shown to be orthogonal so that $$\bar{u}_1\cdot\bar{u}_1=1, \bar{u}_2\cdot\bar{u}_2=1, \bar{u}_1\cdot\bar{u}_2=0.$$

The electromagnetic wave resulting at the entrance point of input directional coupler 11 in resonator 10 resulting from the coupling action of that coupler is $$T_{11-c}E_{i-11} = i\sqrt{k_1}\sqrt{1-\gamma_1}\begin{bmatrix}\cos\theta_{11} & -\sin\theta_{11} \\ \sin\theta_{11} & \cos\theta_{11}\end{bmatrix}\begin{bmatrix}1 \\ 0\end{bmatrix}pE_i$$

$$= i\sqrt{k_1}\sqrt{1-\gamma_1}\,pE_i\begin{bmatrix}\cos\theta_{11} \\ \sin\theta_{11}\end{bmatrix}.$$

using the expressions for the coupler operator and the input optical fiber wave found above. The column vectors $$\begin{bmatrix}\cos\theta_{11} \\ \sin\theta_{11}\end{bmatrix}$$

is expressed in a two-dimensional vector space having its basis vectors lying along the "x" and "y" axes, or the principal axis of birefringence in the resonator optical fiber. However, this vector can be reexpressed in that vector space on the basis of the two eigenvectors just found for the round trip matrix operator A, or:

$$\begin{bmatrix}\cos\theta_{11} \\ \sin\theta_{11}\end{bmatrix} \triangleq a_1u_1 + a_1u_2,$$

where $a_1$ and $a_2$ are the components of the last vector expressed on the vector space basis formed by the eigenvectors. Thus, the electromagnetic wave coupled into resonator coil 10 at the entrance point in directional coupler can be expressed as a combination of eigenvectors each of which is multiplied by the corresponding eigenvalue upon transmission through resonator coil 10 with the result being the sum of the resultant components which are transmitted through the resonator which occurs without mixing therebetween.

The effect of the round trip matrix operator on these entrance point electromagnetic waves in resonator coil 10 becomes $$AT_{11-cE_{i-11}} = i\sqrt{k_1} \sqrt{1-\gamma_1} \, pE_i(a_1\lambda_1 u_1 + a_2\lambda_2 u_2).$$

This result has been obtained using the eigenstate transformation equation given above, $A\bar{u}_1 = \lambda_1 \bar{u}_1$ and $A\bar{u}_2 = -\lambda_2 \bar{u}_2$. Hence, repeated applications of round trip matrix operator $A$ gives the following with the results of these repetitions of use of that operator being summed to $$\sum_{n=0}^{\infty} A^n T_{11-cE_{i-11}} = i\sqrt{k_1} \sqrt{1-\gamma_1} \, pE_i \sum_{n=0}^{\infty}(a_1\lambda_1^n u_1 + a_2\lambda_2^n u_2)$$

$$= i\sqrt{k_1} \sqrt{1-\gamma_1} \, pE_i \left(\frac{a_1}{1-\lambda_1} u_1 + \frac{a_2}{1-\lambda_2} u_2\right)$$

This last equation was obtained using the well known series summation result for a geometric series.

Thus, the electric field $\bar{E}_{ccw-12}$ at the exit point in directional coupler 12 becomes the following:

$$E_{ccw-12} = i\sqrt{k_1}\sqrt{1-\gamma_1}\sqrt{\frac{1-\gamma_3}{2}} e^{-\alpha\frac{l_1+l_2}{2}} pE_i \times$$

$$\left\{ \frac{a_1}{(1-\lambda_1)(1+\epsilon\sin\delta + \theta_{11}'\sin\zeta + \theta_{12}'\sin\sigma)^{\frac{1}{2}}} \times \right.$$

$$\begin{bmatrix} -\epsilon e^{-i\beta_{o-1,x}(l_1+l_2)} - \dfrac{e^{-i(\beta_{o-1,x}l_1 + \beta_{o-1,y}l_2 + \frac{\pi}{2} - \zeta)}}{1 - \epsilon\sin\delta - \theta_{11}'\sin\zeta - \theta_{12}'\sin\sigma} \\ e^{-i(\beta_{o-1,x}l_2 + \beta_{o-1,y}l_1)} - \dfrac{\epsilon e^{-i(\beta_{o-1,y}l_1 + \beta_{o-1,y}l_2 + \frac{\pi}{2} - \zeta)}}{1 - \epsilon\sin\delta - \theta_{11}'\sin\zeta - \theta_{12}'\sin\sigma} \end{bmatrix} +$$

$$\frac{a_2}{(1-\lambda_2)(1-\epsilon\sin\delta - \theta_{11}'\sin\zeta - \theta_{12}'\sin\sigma)^{\frac{1}{2}}} \times$$

$$\begin{bmatrix} -\epsilon e^{-i\beta_{o-1,x}(l_1+l_2)} - \dfrac{e^{-i(\beta_{o-1,x}l_1 + \beta_{o-1,y}l_2 - \frac{\pi}{2} - \zeta)}}{1 + \epsilon\sin\delta + \theta_{11}'\sin\zeta + \theta_{12}'\sin\sigma} \\ e^{-i(\beta_{o-1,x}l_2 + \beta_{o-1,y}l_1)} - \dfrac{\epsilon e^{-i(\beta_{o-1,y}l_1 + \beta_{o-1,y}l_2 - \frac{\pi}{2} - \zeta)}}{1 + \epsilon\sin\delta + \theta_{11}'\sin\zeta + \theta_{12}'\sin\sigma} \end{bmatrix} \right\}$$

Using the simplified values found for eigenvalues $\lambda_1$ and $\lambda_2$, the factors $1/(1-\lambda_1)$ and $1/(1-\lambda_2)$ can be written $$\frac{1}{1-\lambda_1} = \frac{1}{1 - Re^{-i\beta_{ccw}L} e^{-i(-\theta-\phi_r)}},$$

$$\frac{1}{1-\lambda_2} = \frac{1}{1 - Re^{-i\beta_{ccw}L} e^{-i(\theta-\phi_r)}},$$

where, $$\theta \stackrel{\Delta}{=} \frac{\pi}{2} + \left(\theta_{13} - \frac{\pi}{2}\right)\cos\delta + \theta_{11}'\cos\zeta + \theta_{12}'\cos\sigma.$$

Thus, these factors are resonance functions for the counterclockwise electromagnetic waves in resonator coil 10, and the fixed phase change portion represented by $\theta$ deviates from the desired value of 90°, or $\pi/2$, not only by an amount related to the difference between the actual rotation angle $\theta_{13}$ and $\pi/2$ but also by the further amount related to the effective rotational misalignment angles in the straight-through portions of couplers and 12. Although just the major locations expected for coupling of counterclockwise electromagnetic waves following one polarization mode in resonator coil 10 to the other mode have been included in the foregoing, the possible occurrence of other coupling points would be expected to add further effective phase change to $\theta$.

Inserting these resonance functions in the last equation for $\bar{E}_{ccw-12}$, and defining some further constants, shows the essential form of that equation as $$E_{ccw-12} = i\sqrt{k_1}\sqrt{1-\gamma_1}\sqrt{\frac{1-\gamma_3}{2}} e^{-\alpha\frac{l_1+l_2}{2}} pE_i \times$$

$$\left\{ \frac{a_1}{1 - Re^{-i\beta_{ccw}L}e^{-i(-\theta-\theta_r)}} b_1 \begin{bmatrix} c_1 \\ c_2 e^{i\xi} \end{bmatrix} + \right.$$

$$\left. \frac{a_2}{1 - Re^{-i\beta_{ccw}L}e^{-i(\theta-\theta_r)}} b_2 \begin{bmatrix} c_3 \\ c_4 e^{i(\xi+\pi)} \end{bmatrix} \right\}$$

The two vectors on the right side of this equation show that there are two polarization eigenstates, or two orthogonally polarized waves, in the counterclockwise electromagnetic waves at the exit point in output directional coupler 12, this being due, of course, to the two different optical paths each followed by a corresponding one of these orthogonally polarized electromagnetic waves. Each of them has a corresponding resonance function, and the contribution to the output wave from each is determined by the ratio of the input amplitude at the entrance point to resonator coil 10 in input directional coupler to the corresponding resonance function for the particular value of the frequency $\omega_o + \omega_1$ occurring in the input electromagnetic wave.

The various constants introduced in this last equation for $\bar{E}_{ccw-12}$ are defined for this last equation on the basis of the preceding equation for $\bar{E}_{ccw-12}$ after appropriate algebraic manipulation. These definitions are the following:

$$c_1 \stackrel{\Delta}{=} \left\{ 1 + 2\epsilon\cos[\beta_{o-1,x}(l_1+l_2)]\cos\left(\beta_{o-1,x}l_1 + \beta_{o-1,y}l_2 + \frac{\pi}{2} - \zeta\right) + \right.$$

$$\left. 2\epsilon\sin[\beta_{o-1,x}(l_1+l_2)]\sin\left(\beta_{o-1,x}l_1 + \beta_{o-1,y}l_2 + \frac{\pi}{2} - \zeta\right)\right\}^{\frac{1}{2}}$$

$$= (1 - 2\epsilon\sin\zeta)^{\frac{1}{2}}$$

-continued $$c_2 \overset{\Delta}{=} \Big[ 1 - 2(\epsilon\sin\delta + \theta_{11}'\sin\zeta + \theta_{12}'\sin\sigma) -$$

$$2\epsilon\cos(\beta_{o-1,x}l_2 + \beta_{o-1,y}l_1)\cos\left(\beta_{o-1,y}l_1 + \beta_{o-1,y}l_2 + \frac{\pi}{2} - \zeta\right) -$$

$$2\epsilon\sin(\beta_{o-1,x}l_2 + \beta_{o-1,y}l_1)\sin\left(\beta_{o-1,y}l_1 + \beta_{o-1,y}l_2 + \frac{\pi}{2} - \zeta\right)\Big]^{\frac{1}{2}}$$

$$= [1 - 2(\epsilon\sin\delta + \theta_{11}'\sin\zeta + \theta_{12}'\sin\sigma) + 2\epsilon\sin\zeta]^{\frac{1}{2}}$$

$$c_3 \overset{\Delta}{=} \Big\{ 1 + 2\epsilon\cos[\beta_{o-1,x}(l_1 + l_2)]\cos\left(\beta_{o-1,x}l_1 + \beta_{o-1,y}l_2 - \frac{\pi}{2} - \zeta\right) +$$

$$2\epsilon\sin[\beta_{o-1,x}(l_1 + l_2)]\sin\left(\beta_{o-1,x}l_1 + \beta_{o-1,y}l_2 - \frac{\pi}{2} - \zeta\right)\Big\}^{\frac{1}{2}}$$

$$= (1 + \epsilon\sin\zeta)^{\frac{1}{2}}$$

$$c_4 \overset{\Delta}{=} \Big[ 1 + 2(\epsilon\sin\delta + \theta_{11}'\sin\zeta + \theta_{12}'\sin\sigma) -$$

$$2\epsilon\cos(\beta_{o-1,x}l_2 + \beta_{o-1,y}l_1)\cos\left(\beta_{o-1,y}l_1 + \beta_{o-1,y}l_2 - \frac{\pi}{2} - \zeta\right) -$$

$$2\epsilon\sin(\beta_{o-1,x}l_2 + \beta_{o-1,y}l_1)\sin\left(\beta_{o-1,y}l_1 + \beta_{o-1,y}l_2 - \frac{\pi}{2} - \zeta\right)\Big]^{\frac{1}{2}}$$

$$= [1 + 2(\epsilon\sin\delta + \theta_{11}'\sin\zeta + \theta_{12}'\sin\sigma) - 2\epsilon\sin\zeta]^{\frac{1}{2}}$$

$$b_1 \overset{\Delta}{=} \frac{e^{i\tan^{-1}\left[\frac{\epsilon\sin\beta_{o-1,x}(l_1+l_2)+\sin(\beta_{o-1,x}l_1+\beta_{o-1,y}l_2+\frac{\pi}{2}-\zeta)}{-\epsilon\cos\beta_{o-1,x}(l_1+l_2)-\cos(\beta_{o-1,x}l_1+\beta_{o-1,y}l_2+\frac{\pi}{2}-\zeta)}\right]}}{(1 + \epsilon\sin\delta + \theta_{11}'\sin\zeta + \theta_{12}'\sin\sigma)^{\frac{1}{2}}(1 - \epsilon\sin\delta - \theta_{11}'\sin\zeta - \theta_{12}'\sin\sigma)}$$

$$b_2 \overset{\Delta}{=} \frac{e^{i\tan^{-1}\left[\frac{\epsilon\sin\beta_{o-1,x}(l_1+l_2)+\sin(\beta_{o-1,x}l_1+\beta_{o-1,y}l_2-\frac{\pi}{2}-\zeta)}{-\epsilon\cos\beta_{o-1,x}(l_1+l_2)-\cos(\beta_{o-1,x}l_1+\beta_{o-1,y}l_2-\frac{\pi}{2}-\zeta)}\right]}}{(1 - \epsilon\sin\delta - \theta_{11}'\sin\zeta - \theta_{12}'\sin\sigma)^{\frac{1}{2}}(1 + \epsilon\sin\delta + \theta_{11}'\sin\zeta + \theta_{12}'\sin\sigma)}$$

$$\xi \overset{\Delta}{=} -\tan^{-1}\left\{\frac{\epsilon\sin[\beta_{o-1,x}(l_1 + l_2)] + \sin\left(\beta_{o-1,x}l_1 + \beta_{o-1,y}l_2 + \frac{\pi}{2} - \zeta\right)}{-\epsilon\cos[\beta_{o-1,x}(l_1 + l_2)] - \cos\left(\beta_{o-1,x}l_1 + \beta_{o-1,y}l_2 + \frac{\pi}{2} - \zeta\right)}\right\} +$$

$$\tan^{-1}\Big\{\Big[-(1 - \epsilon\sin\delta - \theta_{11}'\sin\zeta - \theta_{12}'\sin\sigma)\sin(\beta_{o-1,x}l_2 + \beta_{o-1,y}l_1) + \epsilon\sin\left(\beta_{o-1,y}l_1 + \beta_{o-1,y}l_2 + \frac{\pi}{2} - \zeta\right)\Big] \times$$

$$\Big[(1 - \epsilon\sin\delta - \theta_{11}'\sin\zeta - \theta_{12}'\sin\sigma)\cos(\beta_{o-1,x}l_2 + \beta_{o-1,y}l_1) - \epsilon\cos\left(\beta_{o-1,y}l_1 + \beta_{o-1,y}l_2 + \frac{\pi}{2} - \zeta\right)\Big]^{-1}\Big\}$$

$$\xi + \pi = \xi' \overset{\Delta}{=} -\tan^{-1}\left\{\frac{\epsilon\sin[\beta_{o-1,x}(l_1 + l_2)] + \sin\left(\beta_{o-1,x}l_1 + \beta_{o-1,y}l_2 - \frac{\pi}{2} - \zeta\right)}{-\epsilon\cos[\beta_{o-1,x}(l_1 + l_2)] - \cos\left(\beta_{o-1,x}l_1 + \beta_{o-1,y}l_2 - \frac{\pi}{2} - \zeta\right)}\right\} +$$

$$\tan^{-1}\Big\{\Big[-(1 + \epsilon\sin\delta + \theta_{11}'\sin\zeta + \theta_{12}'\sin\sigma)\sin(\beta_{o-1,x}l_2 + \beta_{o-1,y}l_1) + \epsilon\sin\left(\beta_{o-1,y}l_1 + \beta_{o-1,y}l_2 - \frac{\pi}{2} - \zeta\right)\Big] \times$$

$$\Big[(1 + \epsilon\sin\delta + \theta_{11}'\sin\zeta + \theta_{12}'\sin\sigma)\cos(\beta_{o-1,x}l_2 + \beta_{o-1,y}l_1) - \epsilon\cos\left(\beta_{o-1,y}l_1 + \beta_{o-1,y}l_2 - \frac{\pi}{2} - \zeta\right)\Big]^{-1}\Big\}$$

The simplified versions of $c_1$, $c_2$, $c_3$ and $c_4$ follow by the use of trigonometric identities.

The values of $a_1$ and $a_2$ can be found from the equation defining them where the input electromagnetic wave vector to resonator coil 10 is represented on the basis of the eigenvectors of round trip matrix A, and on the orthronormality of those eigenvectors. Thus, for $a_1$, the result obtained is $$[u_1]^T \begin{bmatrix} \cos\theta_{11} \\ \sin\theta_{11} \end{bmatrix} = \frac{1}{\sqrt{2} (1 + \epsilon\sin\delta + \theta_{11}'\sin\zeta + \theta_{12}'\sin\sigma)^{\frac{1}{2}}} \times$$

-continued $$\left[1\frac{e^{-i\zeta(-\frac{\pi}{2})}}{1-\epsilon\sin\delta - \theta_{11}'\sin\zeta - \theta_2'\sin\sigma}\right]\begin{bmatrix}\cos\theta_{11}\\ \sin\theta_{11}\end{bmatrix}$$

$$= a_1u_1 \cdot u_1 + a_2u_1 \cdot u_2 = a_1.$$

$$a_1 = \frac{1 - \epsilon\sin\delta - \theta_{11}'\sin\zeta - \theta_{12}'\sin\sigma + \theta_{11}\sin\zeta}{[2(1 - \epsilon\sin\delta - \theta_{11}'\sin\zeta - \theta_{12}'\sin\sigma)]^{\frac{1}{2}}} \times$$

$$e^{i\tan^{-1}\left(\frac{-\theta_{11}\cos\zeta}{1-\epsilon\sin\delta-\theta_{11}'\sin\zeta-\theta_{12}'\sin\sigma+\theta_{11}\sin\zeta}\right)}$$

Similarly, $a_2$ is found using $\vec{u}_2$ to give $$a_2 = \frac{1 + \epsilon\sin\delta + \theta_{11}'\sin\zeta + \theta_{12}'\sin\sigma - \theta_{11}\sin\zeta}{[2(1 + \epsilon\sin\delta + \theta_{11}'\sin\zeta + \theta_{12}'\sin\sigma)]^{\frac{1}{2}}} \times$$

$$e^{i\tan^{-1}\left(\frac{\theta_{11}\cos\zeta}{1+\epsilon\sin\delta+\theta_{11}'\sin\zeta+\theta_{12}'\sin\sigma-\theta_{11}\sin\zeta}\right)}$$

Hence, a complete representation for $\vec{E}_{ccw-12}$, the electric field of the electromagnetic wave propagating in the counterclockwise direction in resonator coil 10 at the exit point in output directional coupler 12, has been provided for the situation of three primary electromagnetic wave coupling locations occurring in connection with resonator coil 10. These are those locations where a polarized electromagnetic wave portion propagating in one polarization mode of the optical fiber can couple to the other polarization mode of that fiber.

A similar presentation can be found for $\vec{E}_{cw-12}$, the electric field of the electromagnetic wave propagating in the clockwise direction which also occurs at the exit point in output directional coupler 12 taking into account the same three primary coupling locations in input directional coupler 11, output directional coupler 12 and splice 13. That representation will not be set out here, as it does not differ in any significant way from that shown for the counterclockwise wave, differing only in details such as the optical frequency being $f_o$ rather than $f_o+f_1$, the use of the appropriate clockwise propagation "constants" rather than those associated with the counterclockwise direction, the opposite sign for the Sagnac phase shift, and the like.

The last equation for the counterclockwise wave $\vec{E}_{ccw-12}$ at the exit point of output directional coupler 12 is more manageable if expressed in magnitude and phase form. First, that equation be viewed as $$\vec{E}_{ccw-12}=\vec{E}_{ccw-12,1}+\vec{E}_{ccw-12,2}.$$

This last equation recognizes that the counterclockwise wave at the exit point in output coupler 12 is represented in the preceding equation therefor as a corresponding pair of polarized constituent waves in two orthogonal polarization states, which will be designated $\vec{E}_{ccw-12,1}$ and $\vec{E}_{ccw-12,2}$, each corresponding to one of the column vectors in that representation. Each of these constituent orthogonal polarization waves comprising the counterclockwise wave can be expressed in its components along the "x" and "y" axes of resonator coil 10 based on the exit point equation for the counterclockwise wave, i.e. along the principal birefringent axes of the fiber in that coil, in magnitude and phase form to yield $$E_{ccw-12,1} = \begin{bmatrix}E_{ccw-12,1,x}\\ E_{ccw-12,1,y}e^{i\xi}\end{bmatrix},$$

$$E_{ccw-12,2} = \begin{bmatrix}E_{ccw-12,2,x}\\ -E_{ccw-12,2,y}e^{i\xi}\end{bmatrix}e^{-i\Phi},$$

where $$E_{ccw-12,1,x} \triangleq \left[\frac{k_1(1-\gamma_1)(1-\gamma_3)e^{-\alpha(l_1+l_2)}p^2E_i^2|a_1|^2|b_1|^2c_1^2}{1+R^2-2R\cos(-\beta_{ccw}L+\phi_r+\theta)}\right]^{\frac{1}{2}}$$

$$E_{ccw-12,1,y} \triangleq \left[\frac{k_1(1-\gamma_1)(1-\gamma_3)e^{-\alpha(l_1+l_2)}p^2E_i^2|a_1|^2|b_1|^2c_2^2}{1+R^2-2R\cos(-\beta_{ccw}L+\phi_r+\theta)}\right]^{\frac{1}{2}}$$

$$E_{ccw-12,2,x} \triangleq \left[\frac{k_1(1-\gamma_1)(1-\gamma_3)e^{-\alpha(l_1+l_2)}p^2E_i^2|a_2|^2|b_1|^2c_3^2}{1+R^2-2R\cos(-\beta_{ccw}L+\phi_r-\theta)}\right]^{\frac{1}{2}}$$

$$E_{ccw-12,2,y} \triangleq \left[\frac{k_1(1-\gamma_1)(1-\gamma_3)e^{-\alpha(l_1+l_2)}p^2E_i^2|a_2|^2|b_1|^2c_4^2}{1+R^2-2R\cos(-\beta_{ccw}L+\phi_r-\theta)}\right]^{\frac{1}{2}}$$

and $$\cos\Phi = \frac{1}{2}\frac{\left([E_{ccw-12,1}]^T\begin{bmatrix}1\\0\end{bmatrix}\right)\left([E^*_{ccw-12,2}]^T\begin{bmatrix}1\\0\end{bmatrix}\right)+\left([E^*_{ccw-12,1}]^T\begin{bmatrix}1\\0\end{bmatrix}\right)\left([E_{ccw-12,2}]^T\begin{bmatrix}1\\0\end{bmatrix}\right)}{\left\{\left([E_{ccw-12,1}]^T\begin{bmatrix}1\\0\end{bmatrix}\right)\left([E_{ccw-12,2}]^T\begin{bmatrix}1\\0\end{bmatrix}\right)\left([E^*_{ccw-12,1}]^T\begin{bmatrix}1\\0\end{bmatrix}\right)\left([E_{ccw-12,2}]^T\begin{bmatrix}1\\0\end{bmatrix}\right)\right\}^{\frac{1}{2}}}$$

$$= \frac{1 - R\cos(-\beta_{ccw}L + \phi_r + \theta) + R^2\cos(2\theta) - R\cos(-\beta_{ccw}L + \phi_r - \theta)}{\{[1 + R^2 - 2R\cos(-\beta_{ccw}L + \Phi_r + \theta)][1 + R^2 - 2R\cos(-\beta_{ccw}L + \phi_r - \theta)]\}^{\frac{1}{2}}},$$

and where the preceding definitions have been used in this last equation. The angle $\Phi$ is the angle between the vector components $E_{ccw-12,2,x}$ and $E_{ccw-12,2,x}$, and is found from a combination of inner products of $\vec{E}_{ccw-12,1}$ and $\vec{E}_{ccw-12,2}$ in the usual manner after projecting each of these vectors onto the normalized input vector.

From the simplified version given of the constants $c_1$, $c_2$, $c_3$ and $c_4$ above, a relationship therebetween is obtained for small coupling of $$c_1c_3 - c_2c_4 = 0$$

As a result, a relationship for the orthogonal wave "x" and "y" axis components also holds from their definitions given above of $$E_{ccw-12,1,x}E_{ccw-12,2,x} - E_{ccw-12,1,y}E_{ccw-12,2,y} = 0,$$

confirming that the two orthogonally polarized waves comprising the counterclockwise wave at the exit point in output coupler 12 are indeed orthogonal.

The counterclockwise electromagnetic wave $\vec{E}_{ccw-12}$ at the exit point in directional coupler 12 is then coupled in part to photodetector 23 by that coupler to provide a corresponding electric field, $\vec{E}_{ccw-d}$, or $$\vec{E}_{ccw-d} = T_{12-c}\vec{E}_{ccw-12}.$$

The matrix operator $T_{12-c}$ is the coupling matrix from the resonator coil 10 side of output directional coupler 12 to the output optical fiber 15 thereof which is described by:

$$T_{12-c} \overset{\Delta}{=} i\begin{bmatrix} \sqrt{k_{2,x}}\sqrt{(1-\gamma_{2,x})}\cos\theta_{12} & -\sqrt{k_{2,x}}\sqrt{(1-\gamma_{2,x})}\sin\theta_{12} \\ \sqrt{k_{2,y}}\sqrt{(1-\gamma_{2,y})}\sin\theta_{12} & \sqrt{k_{2,y}}\sqrt{(1-\gamma_{2,y})}\cos\theta_{12} \end{bmatrix}$$

This coupling matrix operator for output directional coupler 12 differs from that used with input directional coupler 11, $T_{11-c}$. The difference is in the recognition that different losses and couplings may occur along the principal birefringent axes in fused couplers, a situation which is taken into account here because of the significant electromagnetic wave presence along each of the principal birefringent axes due to the coupling between these axes having occurred in resonator coil 10. In contrast, very little of those electromagnetic waves to be coupled by input coupler 11 to resonator coil 10 propagate along the polarization axis in input optical fiber 14 not favored in the alignment of that fiber with chip 16 to receive polarized electromagnetic waves therefrom for such coupling so that differential losses will make little difference in the input coupler.

The different losses and couplings along the two principal birefringent axes in output coupler 12 must thus be separately designated. The coupling factor for the "x" axis in output coupler 12 is written $k_{2,x}$ and the loss factor for that axis is $\gamma_{2,x}$. Similarly, the coupling factor for the "y" axis in output coupler 12 is written $k_{2,y}$ and the loss factor for that axis is $\gamma_{2,y}$.

Output fiber 15 is quite short so that little loss occurs therein, and any coupling therein is conveniently contained in the matrix operator representing output coupler 12. Thus, no operator is used to represent output coupler 15 in the foregoing equation.

Since photodetector 23 responds to the intensity of the electromagnetic waves impinging thereon, the intensity at photodetector 23, $I_{ccw-d}$, must be obtained from the electric field of the portion of the resonator counterclockwise waves coupled to this photodetector $$\vec{E}_{ccw-d}, \text{ or}$$

$$I_{ccw-d} = \vec{E}_{ccw-d} \cdot \vec{E}^*_{ccw-d}.$$

Substituting for $\vec{E}_{ccw-d}$ from the last equation, and using appropriate ones of the equations preceding it, results in the intensity being found as $$\begin{aligned}I_{ccw-d} = &\Gamma[E^2_{ccw-12,1,x} + E^2_{ccw-12,2,x} + E^2_{ccw-12,1,y} + E^2_{ccw-12,2,y}] + \\ &\Delta\Gamma[E^2_{ccw-12,1,x} - E^2_{ccw-12,1,y} + E^2_{ccw-12,2,x} - E^2_{ccw-12,2,y}]\cos2\theta_{12} + \\ &2\Delta\Gamma\sin2\theta_{12}\cos\xi[E_{ccw-12,2,x}E_{ccw-12,2,y} - E_{ccw-12,1,x}E_{ccw-12,1,y}] + \\ &4\Delta\Gamma\cos2\theta_{12}E_{ccw-12,1,x}E_{ccw-12,1,y}\cos\Phi + \\ &2\Delta\Gamma\sin2\theta_{12}\cos\xi[E_{ccw-12,1,x}E_{ccw-12,2,y} - E_{ccw-12,1,y}E_{ccw-12,2,x}]\cos\Phi + \\ &2\Delta\Gamma\sin2\theta_{12}\sin\xi[E_{ccw-12,1,x}E_{ccw-12,2,y} + E_{ccw-12,1,y}E_{ccw-12,2,x}]\sin\Phi\end{aligned}$$

where $$\Gamma \overset{\Delta}{=} \frac{k_{2,x}(1-\gamma_{2,x}) + k_{2,y}(1-\gamma_{2,y})}{2},$$

$$\Delta\Gamma \overset{\Delta}{=} \frac{k_{2,x}(1-\gamma_{2,x}) - k_{2,y}(1-\gamma_{2,y})}{2},$$

indicating by $\Gamma$ the average of, and by $\Delta\Gamma$ the difference between, the differing couplings and losses along the "x" and "y" axes.

The intensity $I_{ccw-d}$ of the counterclockwise electromagnetic wave portion reaching photodetector 23 can be written in terms of the intensity of each of the coupling result waves reaching that same photodetector, $I_{ccw-d,1}$ and $I_{ccw-d,2}$, that are based on the orthogonal polarized waves forming the counterclockwise wave at the exit point of resonator 10. These detected intensities associated with the resonator orthogonal polarization waves electric fields are defined below, and evaluated from the definitions of $\vec{E}_{ccw-12,1}$ and $\vec{E}_{ccw-12,2}$ and of the components thereof, and from the definition of the coupling matrix $T_{11-c}$ given above for output coupler 12, as $$\begin{aligned}I_{ccw-d,1} &\overset{\Delta}{=} [E_{ccw-12,1}]^T T^T_{12-c} T^*_{12-c}[E^*_{ccw-12,1}] \\ &= \Gamma(E^2_{ccw-12,1,x} + E^2_{ccw-12,1,y}) + \Delta\Gamma(E^2_{ccw-12,1,x} - E^2_{ccw-12,1,y})\cos2\theta_{12} - \\ &\quad 2\Delta\Gamma\sin2\theta_{12}\cos\xi E_{ccw-12,1,x}E_{ccw-12,1,y}\end{aligned}$$

$$\begin{aligned}I_{ccw-d,2} &\overset{\Delta}{=} [E_{ccw-12,2}]^T T^T_{12-c} T^*_{12-c}[E^*_{ccw-12,2}] \\ &= \Gamma(E^2_{ccw-12,2,x} + E^2_{ccw-12,2,y}) + \Delta\Gamma(E^2_{ccw-12,2,x} - E^2_{ccw-12,2,y})\cos2\theta_{12} + \end{aligned}$$

-continued $$2\Delta\Gamma\sin2\theta_{12}\cos\xi E_{ccw-12,2,x}E_{ccw-12,2,y}.$$

The equations defining $E_{ccw-12,1,x}$, $E_{ccw-12,1,y}$, $E_{ccw-12,2,x}$ and $E_{ccw-12,2,y}$ can be manipulated to show photodetector 23, the expression for the total intensity at photodetector 23 can be rewritten as $$I_{ccw-d} \approx I_{ccw-d,1} + I_{ccw-d,2} + \frac{2\Delta\Gamma}{\Gamma}\cos2\theta_{12}\sqrt{I_{ccw-d,1}I_{ccw-d,2}}\cos\Phi +$$

$$\frac{\Delta\Gamma}{\Gamma}\sin2\theta_{12}\cos\xi\left\{\left(\left\{\frac{1+2[\epsilon\sin\delta+(\theta_{11}'-\epsilon)\sin\zeta+\theta_{12}'\sin\sigma]}{1+2\epsilon\sin\zeta}\right\}^{\frac{1}{2}}-\right.\right.$$

$$\left.\left.\left\{\frac{1-2[\epsilon\sin\delta+(\theta_{11}'-\epsilon)\sin\zeta+\theta_{12}'\sin\sigma]}{1-2\epsilon\sin\zeta}\right\}^{\frac{1}{2}}\right)\right\}\sqrt{I_{ccw-d,1}I_{ccw-d,w}}\cos\Phi +$$

$$\frac{\Delta\Gamma}{\Gamma}\sin2\theta_{12}\cos\xi\left\{\left(\left\{\frac{1+2[\epsilon\sin\delta+(\theta_{11}'-\epsilon)\sin\zeta+\theta_{12}'\sin\sigma]}{1+2\epsilon\sin\zeta}\right\}^{\frac{1}{2}}+\right.\right.$$

$$\left.\left.\left\{\frac{1-2(\epsilon\sin\delta+(\delta_{11}'-\epsilon)\sin\zeta+\theta_{12}'\sin\sigma]}{1-2\epsilon\sin\zeta}\right\}^{\frac{1}{2}}\right)\right\}\sqrt{I_{ccw-d,1}I_{ccw-d,2}}\sin\Phi$$

$$\approx I_{ccw-d,1} + I_{ccw-d,2} + \frac{2\Delta\Gamma}{\Gamma}\cos2\theta_{12}\sqrt{I_{ccw-d,1}I_{ccw-d,2}}\cos\Phi +$$

$$\frac{2\Delta\Gamma}{\Gamma}\sin2\theta_{12}\sin\xi\sqrt{I_{ccw-d,1}I_{ccw-d,2}}\sin\Phi$$

$$\approx I_{ccw-d,1} + I_{ccw-d,2} + K\sqrt{I_{ccw-d,1}I_{ccw-d,2}}\cos\Phi.$$

the following relationships:

$$E_{ccw-12,1,y} =$$

$$E_{ccw-12,1,x}\left\{\frac{1-2[\epsilon\sin\delta+(\theta_{11}'-\epsilon)\sin\zeta+\theta_{12}'\sin\sigma]}{1-2\epsilon\sin\zeta}\right\}^{\frac{1}{2}},$$

$$E_{ccw-12,2,y} =$$

$$E_{ccw-12,2,x}\left\{\frac{1+2[\epsilon\sin\delta+(\theta_{11}'-\epsilon)\sin\zeta+\theta_{12}'\sin\sigma]}{1+2\epsilon\sin\zeta}\right\}^{\frac{1}{2}}.$$

Then, the product of the intensities of the orthogonal polarization waves at photodetector 23, $I_{ccw-c,1}$ $I_{ccw-12,2}$, becomes $$I_{ccw-d,1}I_{ccw-d,2} = 4\Gamma^2 E^2_{ccw-12,1,x}E^2_{ccw-12,2,x} \times$$

$$\left\{\left(\frac{1}{2}+\frac{1}{2}\left[\frac{1-4\epsilon(\epsilon\sin\delta+\theta_{11}'\sin\zeta+\theta_{12}'\sin\sigma)\sin\zeta+4\epsilon^2\sin^2\zeta}{1-4\epsilon^2\sin^2\zeta}\right]\right)+\right.$$

$$\left.\frac{\Delta\Gamma^2}{\Gamma^2}\left(\frac{1}{2}-\frac{1}{2}\left[\frac{1-4\epsilon(\epsilon\sin\delta+\theta_{11}'\sin\zeta+\theta_{12}'\sin\sigma)\sin\zeta+4\epsilon^2\sin^2\zeta}{1-4\epsilon^2\sin^2\zeta}\right]\right)\times\right.$$

$$\left.\cos^2\theta_{12}\right)-\frac{\Delta\Gamma^2}{\Gamma^2}\sin^2\theta_{12}\cos^2\xi\right\}$$

$$\approx 4\Gamma^2 E^2_{ccw-12,1,x}E^2_{ccw-12,2,x}$$

The last approximation follows from the small values of $\epsilon$, $\Delta\Gamma$ and $\theta_{12}$.

Using this last approximation, and the definitions for the intensities of the orthogonal polarized waves at The second approximation in this last equation follows from algebraic manipulation showing that the value within the first pair of double braces is nearly zero, and that the value within the second pair of double braces is approximately 2. Since in good quality fused couplers $$\sin2\theta_{12} < \cos2\theta_{12},$$

the last approximation for $I_{ccw-d}$ follows using the definition $$K_{ccw} \stackrel{\Delta}{=} \frac{2\Delta\Gamma}{\Gamma}\cos2\theta_{12}.$$

The quantity $K_{ccw}$ is thus a measure of the quality of output directional coupler 12 both as to the extent of its relative differential couplings and losses, and as to the extent of polarization mode coupling, for electromagnetic waves occurring therein having propagated in the counterclockwise direction in resonator coil 10.

Thus, the presence of differential losses in output directional coupler 12, or $K_{ccw} \neq 0$, leads to the total electromagnetic wave intensity at photodetector 23 having an interference term representing interference between the coupled wave results (no longer orthogonal to one another) due to the coupling into output fiber 15 of the two orthogonal polarized waves in resonator coil 10 which together form the counterclockwise wave in that resonator. Such interference leads to asymmetry in the resonance peaks on the optical frequency axis of the detected counterclockwise wave which in turn lead to the bias modulation system controlling serrodyne generator 27 forcing that generator to provide an incorrect value for frequency $f_1$, and so to a significant error in the gyroscope output signal.

In addition, the superposition at photodetector 23 of the intensities of the waves resulting by coupling from the orthogonal polarization waves in resonator coil 10, shown by the addition of $I_{ccw-d,1}$ and $I_{ccw-d,2}$ in the last equation for the total intensity $I_{ccw-d}$, will lead to a further source of error because the corresponding resonance peaks on the optical frequency axis are, as a result, not evenly spaced along this frequency axis because of the presence of electromagnetic wave coupling occurring at locations in input directional coupler 11 and output directional coupler 12, and because of the presence of a rotation other than exactly 90° between the principal birefringent axes on opposite sides of splice 13.

Such uneven spacing of the opposite mode resonance peaks in either the counterclockwise direction or clockwise direction electromagnetic waves in resonator coil 10 leads to such resonance peaks being asymmetrical in that each one has a less steep slope on that side thereof that is closer to an adjacent opposite mode resonance than the other side of that same resonance which is necessarily further from its adjacent opposite mode resonance. These asymmetries in the resonance peaks due to unequal spacing between adjacent opposite mode resonance peaks are further compounded by the maximum values therein having different magnitudes. Again, such asymmetries can lead to the bias modulation system directing serrodyne generator 27 to set an erroneous value for frequency $f_1$, and so lead to a rate bias error in the gyroscope output.

The difference in the intensities of the two waves at photodetector 23 resulting from the coupling thereto of the two counterclockwise orthogonal polarized waves in resonator coil 10, both in the frequency axis positions of resonance peaks therein and in the maximum amplitudes thereof, are clearly shown in the representations of those intensities in terms of the electromagnetic radiation input of laser 22 and the system parameters. Thus, inserting into the equations given earlier for $I_{ccw-d,1}$ and $I_{ccw-d,2}$ the values defined for $E_{ccw-12,1,x}$, $E_{ccw-12,1,y}$, $E_{ccw-12,2,x}$ and $E_{ccw-12,2,y}$ yields $$I_{ccw-d,1} = \frac{(1-R)^2 I_{ccw-d,1,max}}{1 + R^2 - 2R\cos(-\beta_{ccw}L + \phi_r + \theta)},$$

$$I_{ccw-d,2} = \frac{(1-R)^2 I_{ccw-d,2,max}}{1 + R^2 - 2R\cos(-\beta_{ccw}L + \phi_r - \theta)}.$$

Here, the peak values of the coupled result components $I_{ccw-d,1}$ and $I_{ccw-d,2}$ are defined as $$I_{ccw-d,1,max} \overset{\Delta}{=}$$

$$\frac{2k_1(1-\gamma_1)(1-\gamma_3)p^2 E_i^2 |a_1|^2 |b_1|^2}{(1-R)^2} \{\{\Gamma[1 - (\epsilon\sin\delta +$$

$$\theta_{11}'\sin\zeta + \theta_{12}'si - \Delta\Gamma\cos2\theta_{12}(\epsilon\sin\delta + \theta_{11}'\sin\zeta + \theta_{12}'\sin\sigma) +$$

$$2\Delta\Gamma\epsilon\cos2\theta_{12}\sin\zeta + \Delta\Gamma\sin2\theta_{12}\cos\xi(1 - 2\epsilon\sin\zeta)^{\frac{1}{2}} \times$$

$$\{1 - 2[\epsilon\sin\delta + (\theta_{11}' - \epsilon)\sin\zeta + \theta_{12}'\sin\sigma]\}^{\frac{1}{2}}\}\},$$

$$I_{ccw-d,2,max} \overset{\Delta}{=}$$

$$\frac{2k_1(1-\gamma_1)(1-\gamma_3)p^2 E_i^2 |a_2|^2 |b_2|^2}{(1-R)^2} \{\{\Gamma[1 + (\epsilon\sin\delta +$$

$$\theta_{11}'\sin\zeta + \theta_{12}'\sin - \Delta\Gamma\cos2\theta_{12}(\epsilon\sin\delta + \theta_{11}'\sin\zeta + \theta_{12}'\sin\sigma) +$$

$$2\Delta\Gamma\epsilon\cos2\theta_{12}\sin\zeta + \Delta\Gamma\sin2\theta_{12}\cos\xi(1 + 2\epsilon\sin\zeta)^{\frac{1}{2}} \times$$

$$\{1 + 2[\epsilon\sin\delta + (\theta_{11}' - \epsilon)\sin\zeta + \theta_{12}'\sin\sigma]\}^{\frac{1}{2}}\}\}.$$

Clearly, the equation for $I_{ccw-d,2}$ has a fixed phase difference of $2\theta$ in the cosine term in its denominator when compared to the argument of the otherwise similar cosine term in the denominator for the equation representing $I_{ccw-d,1}$. This phase difference in the denominator cosine argument in the equation for $I_{ccw-d,2}$ as compared to the argument of the cosine in the denominator for the equation representing $I_{ccw-d,1}$, leaves its resonance peak unequally spaced in frequency between two successive resonance peaks of $I_{ccw-d,1}$. In addition, intensity peaks $I_{ccw-d,1,max}$ and $I_{ccw-d,2,max}$ can clearly differ significantly in magnitude depending on various system parameters. Hence, there will be asymmetries in adjacent, opposite mode resonance peaks leading to the kind of error resulting from the superposition of them as described above. Similar equations are found for the electromagnetic waves impinging on photodetector 24 coupled from the clockwise waves in resonator coil 10. Therefore, a resonant fiber optic gyroscope is desired which avoids this second kind of error, as well as the first kind of error due to interference as described above.

SUMMARY OF THE INVENTION

The present invention provides an error reducer for reducing rotation rate errors arising because of polarization modes coupling and differing polarization modes characteristics associated with a coiled optical fiber having a pair of principal birefringent axes in a rotation sensor capable of sensing rotation about a symmetry axis of that coiled optical fiber which forms a closed optical path. This coiled optical fiber has a transfer means for transferring electromagnetic radiation propagating along one of said principal birefringent axes into propagating along the other of the axes. The coiled optical fiber is connected with at least a first coil coupler such that electromagnetic waves can be coupled between the coiled optical fiber and a first external optical fiber. Rotation sensing is based on having opposing electromagnetic waves propagate through the coiled optical fiber in opposing directions so as to result in each impinging at least in part on a corresponding one of first and second photodetectors. At least one of the opposing coiled optical fiber electromagnetic waves, propagating in said opposing directions, is subject to having frequencies thereof varied by selected signals supplied to a first input of an electromagnetic wave source capable of supplying the emitted electromagnetic wave from which that opposing coiled optical fiber electromagnetic wave is obtained. The first photodetector provides an output signal in response to such impingement thereon of a corresponding opposing coiled optical fiber electromagnetic wave which is representative of that wave. An oscillating frequency value setting arrangement has an output electrically connected to the first input of the source to provide an output signal sufficient to cause the source to direct said opposing coiled optical fiber electromagnetic waves propagating in one of said opposing directions to oscillate in frequency value between frequencies occurring in adjacent opposite polarization mode resonances of those waves.

DETAILED DESCRIPTION OF THE PREFERRED EMBODIMENTS

Figure 1:
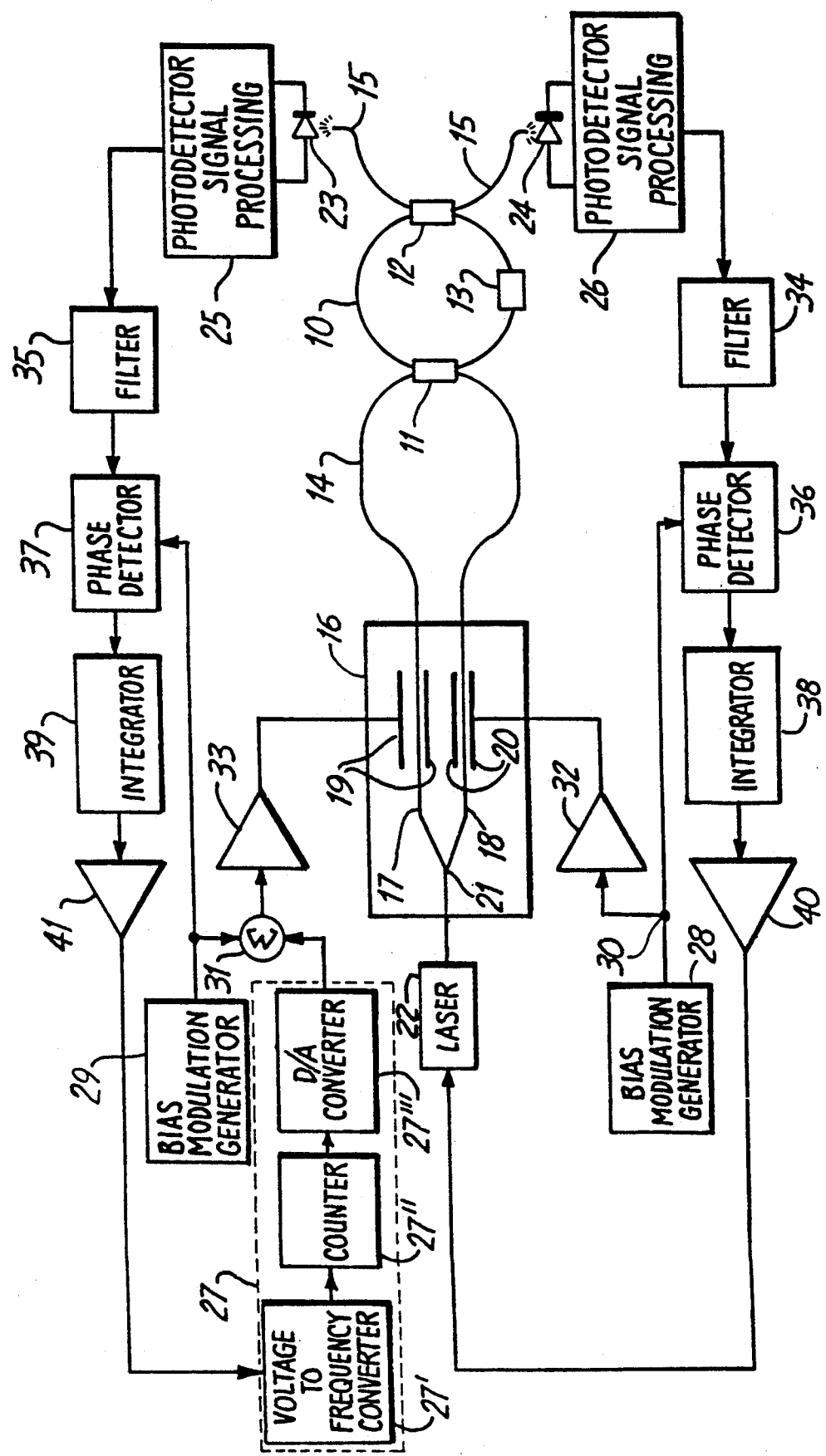
FIG. 1 shows a system schematic diagram of a resonator fiber optic gyroscope known in the prior art combining a signal processing arrangement and an optical transmission path and device arrangement.
Figure 2:
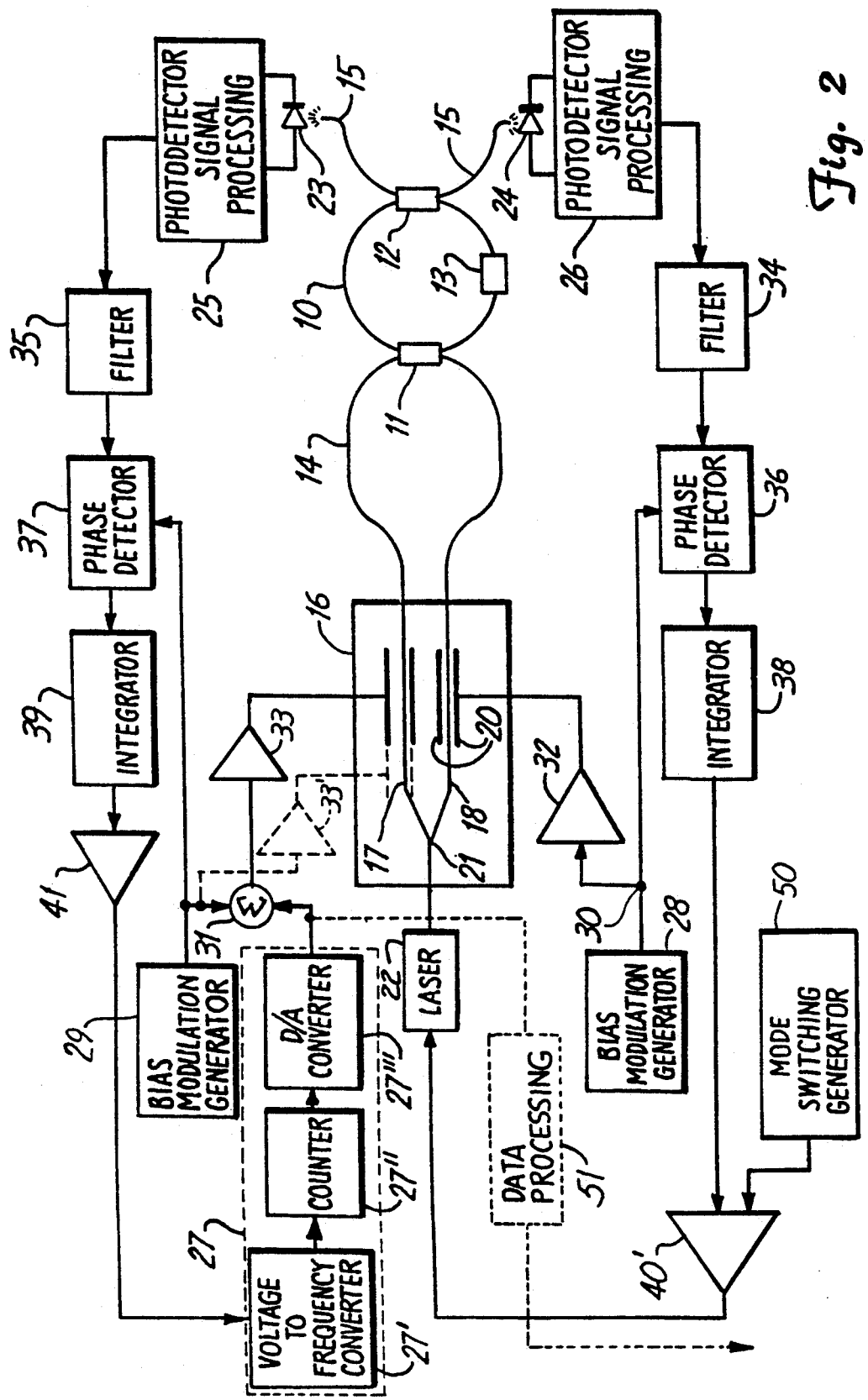
FIG. 2 shows a system schematic diagram of a resonator fiber optic gyroscope embodying the present invention combining a signal processing arrangement and an optical transmission path and device arrangement.

FIG. 2 shows an embodiment of the present invention in which an error reducing arrangement has been added to the system shown in FIG. 1 to provide an output signal representing the rotation rate of the sensor having errors therein substantially reduced or eliminated which would otherwise present therein due to (a) misalignment of the rotated birefringent axes on either side of the resonator splice, (b) the presence of other polarization mode coupling locations, and (c) fused coupler polarization mode differences insofar as couplings and losses associated therewith. Designations used for the various devices, transmission paths and blocks in FIG. 2 are the same as those that were used in FIG. 1 for the corresponding items shown there.

A system configuration alternative is shown in FIG. 2 that was not shown in FIG. 1 through which summer 31 can be eliminated through use of another phase modulator, 19', shown in dashed line form in integrated optic chip 16 in FIG. 2. In this situation, the output of controlled serrodyne generator 27 will be directly connected to the output of amplifier 33 with summer 31 eliminated. The output of bias modulator generator 29 in this arrangement follows a dashed line interconnection arrangement shown in FIG. 2 by first being connected to the input of another amplifier, 33', to supply the necessary voltage to operate phase modulator 19'. The output of amplifier 33' in FIG. 2 is connected by a dashed line to phase modulator 19 so that the electromagnetic waves passing therethrough are phase modulated in accordance with a signal provided by generator 29 through amplifier 33'.

The error reducing arrangement provided in FIG. 2 comprises changing amplifier 40 of FIG. 1 to a summing amplifier, 40', in FIG. 2 having one input connected to the output of integrator 38 to receive the laser 22 control feedback loop error signal therefrom. Further, in addition to the signal from integrator 38 being provided to summing amplifier 40', there is a another signal provided at the other input of summing amplifier 40' from the output of a mode switching generator, 50. This generator 50 output signal is in the form of a square wave voltage waveform which is combined with the output signal from integrator 38 in summing amplifier 40'.

The amplitude of the square wave signal supplied at the output of generator 50 is sufficient to cause laser 22 to oscillate back and forth between frequencies, typically between approximately the maximum amplitude frequencies, of a pair of adjacent, opposite mode resonance peaks for the clockwise electromagnetic wave in resonator coil 10. The frequencies in that pair of resonance peaks will be close to, or at, the frequency $f_o$ as the frequency of laser 22 is directed toward resonant values for resonator coil 10 by the output signal of integrator 38.

Such an arrangement can substantially reduce or eliminate the errors described above coming about because of asymmetries in resonant peaks of the counterclockwise wave (and similar peaks in the clockwise wave) arising because of the misalignment of the birefringent axes in splice 13 to a rotation angle other than exactly 90°, the presence of other unwanted polarization mode coupling locations particularly in the input and output couplers, and because of differential couplings and losses in the "x" and "y" axes in the coupling from resonator coil 10 to output optical fiber 15. This improvement can be shown by considering the intensity occurring at photodetector 23 for each of the frequencies switched between, here designated $f_{R1}$ and $f_{R2}$ for a pair of frequencies each intended to be close to a different one of two adjacent opposite mode resonant lineshapes of the counterclockwise direction in resonator coil 10 occurring over frequencies close to $f_o+f_1$. Those intensities, from the above equation found for the total intensity $I_{ccw-d}$ occurring at photodetector 23, are $$I_{ccw-d,f_{R1}} = I_{ccw-d,1,f_{R1}} + I_{ccw-d,2,f_{R1}} +$$

$$K_{ccw}\sqrt{I_{ccw-d,1,f_{R1}}I_{ccw-d,2,f_{R1}}}\cos\Phi_{f_{R1}},$$

$$I_{ccw-d,f_{R2}} = I_{ccw-d,1,f_{R2}} + I_{ccw-d,1,f_{R2}} +$$

$$K_{ccw}\sqrt{I_{ccw-d,1,f_{R2}}I_{ccw-d,2,f_{R2}}}\cos\Phi_{f_{R2}}.$$

From the previous equations found for $I_{ccw-d,1}$ and $I_{ccw-d,2}$, the intensities at frequencies $f_{R1}$ and $f_{R2}$ of the coupled results corresponding to the two orthogonal polarization waves in resonator coil 10 forming the counterclockwise wave are as follows:

$$I_{ccw-d,1,f_{R1}} = \frac{(1-R)^2 I_{ccw-d,1,max}}{1+R^2 - 2R\cos(-\beta_{ccw-f_{R1}}L + \phi_r + \theta)} =$$

$$\frac{(1-R)^2 I_{ccw-d,1,max}}{1+R^2 - 2R\cos\psi_{ccw-f_{R1}}}$$

$$I_{ccw-d,2,f_{R1}} = \frac{(1-R)^2 I_{ccw-d,2,max}}{1+R^2 - 2R\cos(-\beta_{ccw-f_{R1}}L + \phi_r - \theta)} =$$

$$I_{ccw-d,1,fR2} = \frac{(1-R)^2 I_{ccw-d,2,max}}{1+R^2-2R\cos(\psi_{ccw-fR1}+2\theta)}$$

$$= \frac{(1-R)^2 I_{ccw-d,1,max}}{1+R^2-2R\cos(-\beta_{ccw-fR2}L+\phi_r+3\theta)}$$

in the cosine arguments, and the first intensity shifted to $-3\theta$.

Similarly, the cosines of the angles between the electric fields of the two resonator counterclockwise orthogonally polarized waves, $\cos\Phi_{fR1}$ and $\cos\Phi_{fR2}$, at these two mode frequencies $f_{R1}$ and $f_{R2}$ are found from the equation given therefor above. The results are $$\cos\Phi_{fR1} = \frac{1-R\cos(\psi_{ccw-fR1})+R^2\cos2\theta-R\cos(\psi_{ccw-fR1}+2\theta)}{\{[1+R^2-2R\cos(\psi_{ccw-fR1}+2\theta)][1+R^2-2R\cos(\psi_{ccw-fR1})]\}^{\frac{1}{2}}},$$

$$\cos\Phi_{fR2} = \frac{1+R\cos(\psi_{ccw-fR2})+R^2\cos2\theta+R\cos(\psi_{ccw-fR2}-2\theta)}{\{[1+R^2-2R\cos(\psi_{ccw-fR2}-2\theta)][1+R^2-2R\cos(\psi_{ccw-fR2})]\}^{\frac{1}{2}}}.$$

$$I_{ccw-d,2,fR2} = \frac{(1-R)^2 I_{ccw-d,1,max}}{1+R^2-2R\cos(\psi_{ccw-fR2}-2\theta)}$$

$$= \frac{(1-R)^2 I_{ccw-d,2,max}}{1+R^2-2R\cos(-\beta_{ccw-fR2}L+\phi_r+\theta)}$$

$$= \frac{(1-R)^2 I_{ccw-d,2,max}}{1+R^2-2R\cos\psi_{ccw-fR2}}$$

where $$\psi_{ccw-fR1} \overset{\Delta}{=} \beta_{ccw-fR1}L - \phi_r - \theta,$$

$$\psi_{ccw-fR2} \overset{\Delta}{=} \beta_{ccw-fR2}L - \phi_r - \theta$$

and the identity $\cos(-\psi)=\cos\psi$ has been used. The intensities of the results of the coupling of the two resonator orthogonal polarized waves at the frequency near the first resonant lineshape, $I_{ccw-d,1,fR1}$ and $I_{ccw-d,2,fR1}$, have the difference in frequency of the resonances thereof set by the difference of $2\theta$ in the denominator cosine arguments of each of the equations on the right thereof, with the first intensity being at the reference value of $-\theta$, and with the second intensity shifted to $+\theta$ therefrom. Similarly, the intensities of the coupled results of the two resonator counterclockwise orthogonally polarized waves at the frequency $f_{R2}$ near the second resonant lineshape, $I_{ccw-d,1,fR2}$ and $I_{ccw-d,2,fR2}$, have the second intensity set at the reference value $-\theta$ The feedback loops in the system of FIG. 2 control its response to such frequency oscillation of laser 22 between frequencies $f_{R1}$ and $f_{R2}$, and so will direct incremental frequency changes in the frequency of laser 22 and in the frequency of serrodyne generator 27 such that only relatively small deviations from resonance occur aside from the transitions between resonant lineshape, the effects of which will settle out well before the next transition. Any changes in $\phi_r$ due to rotation will also be relatively slow so that near-resonant conditions are maintained even in a dynamic situation. Thus, these last six equations can be validly expanded in terms of the time varying phase angles $$\Delta\psi_{ccw-fR1} \overset{\Delta}{=} \psi_{ccw-fR1} - n2\pi \text{ and } \Delta\psi_{ccw-fR2} \overset{\Delta}{=} \psi_{ccw-fR2} - n2\pi$$

(n an integer) in a Taylor series about a resonant frequency to evaluate the response of the system of FIG. 2 to excursions in frequency therefrom. These six expansions are truncated approximations to the effects of frequency excursions from the resonant frequency on the system of FIG. 2 in that accuracy has been judged sufficient if only terms therein up through the second powers of $\Delta\psi_{ccw-fR1}$ and $\Delta\psi_{ccw-fR2}$ are kept. Terms containing $\psi\pm2\theta$ are expanded and approximated considering $\epsilon$ small so that $\theta$ is close to $\pi/2$ and the equations in which $2\theta$ appear are at a minimum. These expansion approximations are then substituted in the equations for $I_{ccw-d,1,fR1}$ and $I_{ccw-d,2,fR2}$. The form of the results can be considerably simplified through defining and using the following defined parameters:

$$h_1 \overset{\Delta}{=} \frac{(1-R)^2}{1+R^2-2R\cos2\theta}$$

$$h_2 \overset{\Delta}{=} \frac{-2R(1-R)^2\sin2\theta}{(1+R^2-2R\cos2\theta)^2}$$

$$h_3 \overset{\Delta}{=} \frac{-K_{ccw}\sqrt{I_{ccw-d,1,max}I_{ccw-d,2,max}}\,R(1-2R-R^2+2R^2\cos2\theta)\sin2\theta}{(1+R^2-2R\cos2\theta)^2}$$

$$h_4 \overset{\Delta}{=} \frac{R}{(1-R)^2}$$

$$h_5 \overset{\Delta}{=} \frac{R(1-R)^2[-(1-R^2)\cos2\theta+2R\cos^22\theta+4R\sin^22\theta]}{(1+R^2-2R\cos2\theta)^3}$$

$$h_6 \overset{\Delta}{=} -\frac{K_{ccw}\sqrt{I_{ccw-d,1,max}I_{ccw-d,2,max}}\,R}{2(1-R)(1+R^2-2R\cos2\theta)^3}[(1+R)(1+R^2)^2 +$$

$$(1+R^2)(1-9R-3R^2-R^3)\cos2\theta + 2R(-1+10R+4R^3-R^4)\cos^22\theta +$$

$$4(-3 + R)R^3\cos^3 2\theta + 4R(1 - R)(-1 + 2R + R^2)\sin^2 2\theta + 8(1 - R)R^3\cos 2\theta \sin^2 2\theta]$$

With these definitions, the two equations for the total intensity at photodetector 23 at each of two adjacent, opposite mode polarization resonant lineshapes become $$I_{ccw-d,fR1} \approx \frac{(1-R)K_{ccw}\sqrt{I_{ccw-d,1,max}I_{ccw-d,2,max}}}{1 + R^2 - 2R\cos 2\theta} +$$

$$I_{ccw-d,1,max} + h_1 I_{ccw-d,2,max} +$$

$$(h_2 I_{ccw-d,2,max} + h_3)\Delta\psi_{ccw-fR1} -$$

the $(h_4 I_{ccw-d,1,max} - h_5 I_{ccw-d,2,max} - h_6)\Delta\psi^2_{ccw-fR1}$, $$I_{ccw-d,fR2} \approx \frac{(1-R)K_{ccw}\sqrt{I_{ccw-d,1,max}I_{ccw-d,2,max}}}{1 + R^2 - 2R\cos 2\theta} +$$

$$I_{ccw-d,2,max} + h_1 I_{ccw-d,1,max} -$$

$$(h_2 I_{ccw-d,1,max} + h_3)\Delta\psi_{ccw-fR2} -$$

$$(h_4 I_{ccw-d,2,max} - h_5 I_{ccw-d,1,max} - h_6)\Delta\psi^2_{ccw-fR2}.$$

Expanding the effective, incremental time varying phase angles $\Delta\psi_{ccw-f1}$ and $\Delta\psi_{ccw-fR2}$ in this last pair of equations yields $$\Delta\psi_{ccw-fR1} = \Delta\beta_{ccw-fR1}L - \phi_r$$

and $$\Delta\psi_{ccw-fR2} = \Delta\beta_{ccw-fR2}L - \phi_r$$

where $$\Delta\beta_{ccw-fR1} = \Delta\left(\frac{\beta_{o-1,x} + \beta_{o-1,y}}{2}\right)_{fR1} + \Delta\beta_n \sin\omega_n t$$

$$= 2\pi\Delta(f_o + f_1)_{fR1}\frac{n_{o-1,x} + n_{o-1,y}}{2}C +$$

$$\Delta\beta_n \sin\omega_n t,$$

and $$\Delta\beta_{ccw-fR2} = \Delta\left(\frac{\beta_{o-1,x} + \beta_{o-1,y}}{2}\right)_{fR2} + \Delta\beta_n \sin\omega_n t$$

$$= 2\pi\Delta(f_o + f_1)_{fR2}\frac{n_{o-1,x} + n_{o-1,y}}{2}C +$$

$$\Delta\beta_n \sin\omega_n t.$$

The incremental changes in $\psi_{ccw-fR1}$ and $\psi_{ccw-fR2}$, or $\Delta\psi_{ccw-fR1}$ and $\Delta\psi_{ccw-fR2}$, reflect frequency shifts, $\Delta(f_o+f_1)_{fR1}$ and $\Delta(f_o+f_1)_{fR2}$, from resonant frequencies caused by the feedback loop responses to errors due to polarization components interferences, superposition effects, and the like. Such frequency shifts also reflect feedback loop responses due to rotation of resonator coil 10 but are unaffected by bias modulation.

These last two photodetector 23 intensities at frequencies $f_{R1}$ and $f_{R2}$ result in corresponding output photocurrents from photodetector 23 being provided in photodetector signal processing electronics 25 and resulting in a corresponding voltage signal applied to filter 35. Then, phase sensitive detector 37 demodulates the corresponding signals supplied by filter 35 to provide the two corresponding first harmonic signal components, $v_{37-fR1}$ and $v_{37-fR2}$, associated these frequencies. A constant, $G_{ccw}$, will be used to represent multiplying the effective gains of bias and amplification electronics 25, filter 35, and phase sensitive detector 37.

These two corresponding first harmonic signal components, alternatingly available at the output of phase sensitive detector 37, are obtained from the corresponding filter signals by having the time average thereof obtained through integrating over the period of the modulation signal, $T_n = 2\pi/\omega_n = 1/f_n$. This integral, as a function occurring factor $y)/2$ in $\beta_{ccw}$, will provide an error signal, indicating by its value an algebraic sign where $f_o + f_1$ is with respect to resonance to thereby provide a discriminant characteristic over frequency for the corresponding feedback loop. This error signal directs that feedback loop to act and cause the counterclockwise wave in resonator coil 10 to take a frequency that permits is to be in resonance therein. Any system errors along the discriminant function are stored in integrator 39 so that they may be corrected in this feedback loop.

Thus, the signals at the output of phase sensitive detector 37 are formed as $$v_{37-fR1} = G_{ccw}\frac{\sqrt{2}}{T_n}\int_0^{T_n} I_{ccw-d,fR1}\sin\omega_n t\, dt,$$

$$v_{37-fR2} = G_{ccw}\frac{\sqrt{2}}{T_n}\int_0^{T_n} I_{ccw-d,fR2}\sin\omega_n t\, dt.$$

Substituting into these integrals from the equations preceding them, as appropriate, and performing the integrations yields $$v_{37-fR1} = \sqrt{2}\, G_{ccw}\bigg\{\frac{h_2 I_{ccw-d,2,max} + h_3}{2} +$$

$$(h_6 - h_4 I_{ccw-d,1,max} + h_5 I_{ccw-d,2,max}) \times$$

$$\left[-\Delta(f_o + f_1)_{fR1}\frac{\pi(n_{o-1,x} + n_{o-1,y})L}{C} + \phi_r\right]\bigg\}\Delta\beta_n,$$

$$v_{37-fR2} = \sqrt{2}\, G_{ccw}\bigg\{-\frac{h_2 I_{ccw-d,1,max} + h_3}{2} +$$

$$(h_6 - h_4 I_{ccw-d,2,max} + h_5 I_{ccw-d,1,max}) \times$$

$$\left[-\Delta(f_o + f_1)_{fR2}\frac{\pi(n_{o-1,x} + n_{o-1,y})L}{C} + \phi_r\right]\bigg\}\Delta\beta_n.$$

A similar set of equations obtained in a similar manner characterizes the clockwise response to the oscillation of the frequency of laser 22 between frequencies $f_{R1}$ and $f_{R2}$. A different constant, $G_{cw}$, of course, Characterizes the gain constants from photodetector 24 through photodetector signal processing electronics 26 and filter 34, and as a result of demodulation in phase sensitive detector 36. The frequency excursion is only in $f_o$ in this instance, and the indices of refraction for the "x" and "y" axes are those encountered in a clockwise propagating wave in resonator coil 10 at average frequency $f_o$ (such averaging eliminating the effects of bias modulation). In any given direction of rotation of resonator coil 10, there will be an opposite phase change to the Sagnac effect for electromagnetic waves traveling in the clockwise direction from that experienced by waves traveling in the counterclockwise direction. As a result, the phase change will be opposite but equal in the clockwise direction to the phase change associated with the counterclockwise direction. Finally, the bias modulation frequency for the clockwise waves is $\omega_m$ rather than $\omega_n$ used in connection with the counterclockwise waves. With these changes, the output signal from phase sensitive detector 36 at frequencies $f_{R1}$ and $f_{R2}$, $v_{36-fR1}$ and $V_{36-fR2}$, are $$v_{36-fR1} = \sqrt{2}\, G_{cw}\left\{ \frac{h_2'I_{cw-d,2,max} + h_3'}{2} + \right.$$

$$(h_6' - h_4'I_{cw-d,1,max} + h_5'I_{cw-d,2,max}) \times$$

$$\left. \left[ -\Delta(f_o)_{fR1} \frac{\pi(n_{o-1,x} + n_{o-1,y})L}{C} - \phi_r \right] \right\} \Delta\beta_m,$$

$$v_{36-fR2} = \sqrt{2}\, G_{cw}\left\{ -\frac{h_2'I_{cw-d,1,max} + h_3'}{2} + \right.$$

$$(h_6' - h_4'I_{cw-d,2,max} + h_5'I_{cw-d,1,max}) \times$$

$$\left. \left[ -\Delta(f_o)_{fR2} \frac{\pi(n_{o-1,x} + n_{o-1,y})L}{C} - \phi_r \right] \right\} \Delta\beta_m.$$

where the prime symbol after the various parameters involving an h indicates they are those appropriate for the clockwise direction.

The feedback loops in the system of FIG. 2 will act to offset any frequency excursions occurring in the frequency of laser 22 or the frequency of serrodyne generator 27. In reasonable steady state situations, these feedback loops will force the signals at the output of phase detectors 36 and 37 to become zero in value. Thus, if $v_{36-fR1}$ and $v_{36-fR2}$ are zero in value, the last two equations will provide the following relationships:

$$-\Delta(f_o)_{fR1} \frac{\pi(n_{o,x} + n_{o,y})L}{C} - \phi_r -$$

$$\frac{-h_2'I_{cw-d,2,max} - h_3'}{2(h_6' - h_4'I_{cw-d,1,max} + h_5'I_{cw-d,2,max})}$$

$$-\Delta(f_o)_{fR2} \frac{\pi(n_{o,x} + n_{o,y})L}{C} - \phi_r -$$

$$\frac{h_2'I_{cw-d,1,max} + h_3'}{2(h_6' - h_4'I_{cw-d,2,max} + h_5'I_{cw-d,1,max})}.$$

Although there will be significant differences between the indices of refraction between the "x" axis and the "y" axis in either the clockwise or the counterclockwise directions in resonator coil 10, there will usually be fairly similar values for the average of the indices of refraction along the "x" and "y" axes in both directions. Taking this to be the situation by dropping the differing frequency subscripts on these indices, and setting signals $v_{36-fR1}$ and $V_{36-fR2}$ to Zero, gives the following result after substituting therein for $\Delta f_o$ the results found in the previous two equations for $\Delta f_o$ to yield $$-\Delta(f_1)_{fR1} \frac{\pi(n_x + n_y)L}{C} =$$

$$\frac{-h_2 I_{ccw-d,2,max} - h_3}{2(h_6 + h_4 I_{ccw-d,1,max} + h_5 I_{ccw-d,2,max})} -$$

$$\frac{-h_2' I_{cw-d,2,max} - h_3'}{2(h_6' - h_4' I_{cw-d,1,max} + h_5' I_{cw-d,2,max})} - 2\phi_r,$$

$$-\Delta(f_1)_{fR2} \frac{\pi(n_x + n_y)L}{C} =$$

$$\frac{h_2 I_{ccw-d,1,max} + h_3}{2(h_6 - h_4 I_{ccw-d,2,max} + h_5 I_{ccw-d,1,max})} -$$

$$\frac{\beta_o - 1 - h_2' I_{cw-d,1,max} + h_3'}{2(h_6' - h_4' I_{cw-d,2,max} + h_5' I_{cw-d,1,max})} - 2\phi_r.$$

Integrator 39 will effectively time average the excursions in $f_1$ for laser 22 oscillating between frequencies $f_{R1}$ and $f_{R2}$ if the oscillation of laser 22 between frequencies $f_{R1}$ and $f_{R2}$ is sufficiently faster than the response time for the serrodyne generator control loop. If the oscillating of laser 22 is significantly slower than this response time, these two signals will be averaged in the subsequent data processing electronics, 51, also receiving the output signal of serrodyne generator 27 and shown in dashed lines as an alternative. Thus, in either situation, the signals of these two equations will be combined for time averaging purposes (ignoring division by 2 as required to form an actual average value) to yield $$-\Delta f_{1-COMB} = -\Delta(f_1)_{fR1} - \Delta(f_1)_{fR2} =$$

$$\frac{C}{\pi(n_x + n_y)L} \left\{ \left[ \frac{h_2 I_{ccw-d,1,max} + h_3}{2(h_6 - h_4 I_{ccw-d,2,max} + h_5 I_{ccw-d,1,max})} - \right. \right.$$

$$\left. \frac{h_2 I_{ccw-d,2,max} + h_3}{2(h_6 + h_4 I_{ccw-d,1,max} + h_5 I_{ccw-d,2,max})} \right] -$$

$$\left[ \frac{h_2' I_{cw-d,1,max} + h_3'}{2(h_6' - h_4' I_{cw-d,2,max} + h_5' I_{cw-d,1,max})} - \right.$$

$$\left. \left. \frac{h_2' I_{cw-d,2,max} + h_3'}{2(h_6' - h_4' I_{cw-d,1,max} + h_5' I_{cw-d,2,max})} - 4\phi_r \right\}.$$

Clearly, while there will be excursions in frequency $f_1$ for changes in $\phi_r$ due to rotation changes of resonator coil 10 about its symmetry axis perpendicular to the plane thereof, there will also be a fixed frequency offset added to the excursions of $f_1$ due to the kinds of error described above, although, as will be seen, significantly reduced from the value which would otherwise occur in the absence of the oscillation of the frequency of laser 22 between frequencies $f_{R1}$ and $f_{R2}$.

The following definitions are made for use with this last equation to clarify the results obtained:

$$\Delta I_{ccw-max} \triangleq \frac{I_{ccw-d,2,max} - I_{ccw-d,1,max}}{2},$$

$$\Delta I_{cw-max} \triangleq \frac{I_{cw-d,2,max} - I_{cw-d,1,max}}{2},$$

-continued going definitions and appropriate substitutions and approximations. The result is $$-\Delta f_{1-AVG.COMB} \triangleq \frac{-\Delta(f_1)_{fR1} - \Delta(f_1)_{fR2}}{2}$$

$$= \frac{C}{\pi(n_x + n_y)L}\left\{\left\{\frac{(1-R)^2\sin2\theta}{(1+R^2-2R\cos2\theta)^2}\left\{4(1-R)^2\left(\frac{\Delta I_{ccw-max} - \Delta I_{cw-max}}{I_{ccw-max} + I_{cw-max}}\right)-\right.\right.\right.$$

$$4(1-R)^2\left(\frac{I_{ccw-max} - I_{cw-max}}{I_{ccw-max} + I_{cw-max}}\right)\left(\frac{\Delta I_{ccw-max} + \Delta I_{cw-max}}{I_{ccw-max} + I_{cw-max}}\right)+$$

$$(1 - 2R - R^2 + 2R^2\cos2\theta)\left[K\left(\frac{\Delta I_{ccw-max} - \Delta I_{cw-max}}{I_{ccw-max} + I_{cw-max}}\right)+\right.$$

$$\Delta K\left(\frac{\Delta I_{ccw-max} + \Delta I_{cw-max}}{I_{ccw-max} + I_{cw-max}}\right)-$$

$$K\left(\frac{I_{ccw-max} - I_{cw-max}}{I_{ccw-max} + I_{cw-max}}\right)\left(\frac{\Delta I_{ccw-max} + \Delta I_{cw-max}}{I_{ccw-max} + I_{cw-max}}\right)-$$

$$\Delta K\left(\frac{I_{ccw-max} - I_{cw-max}}{I_{ccw-max} + I_{cw-max}}\right)\left(\frac{\Delta I_{ccw-max} - \Delta I_{cw-max}}{I_{ccw-max} + I_{cw-max}}\right)\right]\right\}- 2\phi_r\right\},$$

$$I_{ccw-max} \triangleq \frac{I_{ccw-d,1,max} + I_{ccw-d,2,max}}{2},$$

$$I_{cw-max} \triangleq \frac{I_{cw-d,1,max} + I_{cw-d,2,max}}{2},$$

$$\Delta K \triangleq \frac{K_{ccw} - K_{cw}}{2},$$

$$K \triangleq \frac{K_{ccw} + K_{cw}}{2}.$$

The constants $\Delta I_{ccw-max}$ and $\Delta I_{cw-max}$ give the differences in the maximum intensities of the adjacent opposite mode resonance lineshapes for the counterclockwise and the clockwise directions, respectively. The constant $I_{ccw-max}$ and $I_{cw-max}$ give the averages of those maximum intensities in those directions. The constant $\Delta K$ represents the difference in the differential coupling constants and losses of output coupler 12 for the counterclockwise and clockwise directions, and K is the average of such differential couplings and losses for those directions.

The last result can be returned to original parameters and reduced after manipulation with the use of the foregoing definitions and appropriate substitutions and approximations. The result is where $-\Delta f_{1-AVG.COMB}$ is the average frequency shift in the output frequency signal. As can be seen in this last equation, that output frequency shift signal has a component due to any rotation of resonator coil 10, represented by $\phi_r$, plus an error residual based on the terms between the pair of single braces. As the constant multiplying the terms in the single braces confirms, the error residual arises only because of the presence of coupling between polarization modes in resonator coil 10 giving rise to a nonzero value for $\theta$ and limits on the finesse of resonator coil 10, i.e. $R \neq 1$.

The last equation further shows that balancing the intensities in each of the wave propagation directions in resonator coil 10, or having $I_{ccw-max}$ very nearly equal to $I_{cw-max}$, will eliminate several of the residual error terms With the pair of single braces. If this balancing of directional intensities is accomplished, the effect on this last equation leads to $$-\Delta f_{1-AVG.COMB} =$$

$$\frac{C}{\pi(n_x + n_y)L}\left\{\left\{\frac{(1-R)^2\sin2\theta}{(1+R^2-2R\cos2\theta)^2}\left\{4(1-R)^2\left(\frac{\Delta I_{ccw-max} - \Delta I_{cw-max}}{I_{ccw-max} + I_{cw-max}}\right)+\right.\right.\right.$$

$$(1 - 2R - R^2 + 2R^2\cos2\theta)\left[K\left(\frac{\Delta I_{ccw-max} - \Delta I_{cw-max}}{I_{ccw-max} + I_{cw-max}}\right)+\right.$$

$$\Delta K\left(\frac{\Delta I_{ccw-max} + \Delta I_{cw-max}}{I_{ccw-max} + I_{cw-max}}\right)\right]\right\}- 2\phi_r\right\}.$$

The error due to the addition, or superposition, of the intensities of shifted, adjacent opposite mode resonance lineshapes is represented by the first term in the pair of single braces in this last equation with the factor $4(1-R)^2$, since no differential coupling or loss is involved therein. This error can be reduced by (a) increasing the resonator finesse, i.e. making R have a value closer to one, and by (b) better matching the polarization mode couplings in the counterclockwise and clockwise directions, i.e. making input and output couplers 11 and 12 more symmetrical with respect to polarization mode couplings of the waves propagating in each of these directions.

Such couplings matching will also reduce the interference error due to the first term in the pair of single brackets, an interference term with the factor K. So will increasing the resonator finesse and reducing resonator coil coupling as shown by the multiplying factor outside the pair of brackets, and as will reducing the output coupler 12 differential couplings and losses, and its polarization modes couplings. The second term in the brackets can also be reduced by all of these steps except couplings matching.

However, measurement of differences in maximum values in adjacent opposite mode resonance lineshapes and of averages thereof, and of $\theta$ and R, permits providing compensation of these remaining error residuals to thereby remove the effects thereof. Such compensation, if used, can be accomplished in data processing electronics 51.

The difference, $$\Delta(f)_{fR1} + \Delta(f)_{fR2} \stackrel{\Delta}{=} -\Delta f_{1-DIFF},$$

between the serrodyne frequency excursions at each of frequencies $f_{R1}$ and $f_{R2}$ is a measure of the error avoided by the oscillating of the frequency of laser 22 between these two frequencies as can be seen from $-\Delta f_{1-COMB} - \Delta f_{1-DIFF} = -2\Delta(f_1)_{fR1}$. The right side of this equation is the equivalent of twice the signal provided by the system of FIG. 2 in the absence of a signal from generator 50 to oscillate the optical frequency of laser 22 between $f_{R1}$ and $f_{R2}$. The value found for $\Delta f_{1-DIFF}$ is $$\Delta f_{1-DIFF} = \Delta(f_1)_{fR1} - \Delta(f_1)_{fR2}$$

$$= -\frac{2C}{\pi(n_x + n_y)L} \frac{(1-R)^2 \sin 2\theta}{(1+R^2-2R\cos 2\theta)^2} \left\{ \left( 8(1-R)^2 \left[ \frac{\Delta I_{ccw-max}^2 - \Delta I_{cw-max}^2}{(I_{ccw-max} + I_{cw-max})^2} \right] + \right.\right.$$

$$(1 - 2R - R^2 + 2R^2\cos 2\theta)\left[ K\left( \frac{\Delta I_{ccw-max}^2 - \Delta I_{cw-max}^2}{(I_{ccw-max} + I_{cw-max})^2} \right) \right] +$$

$$\left.\left. \Delta K \left[ \frac{\Delta I_{ccw-max}^2 + \Delta I_{cw-max}^2}{(I_{ccw-max} + I_{cw-max})^2} \right] + \Delta K \right) \right\}.$$

Thus, both superposition and interference errors are removed by oscillating laser 22 between frequencies $f_{R1}$ and $f_{R2}$ with the interference error being substantially more significant for a relatively high finesse resonator coil 10.

There are a number of variations of the implementation of the resonator fiber optic gyroscope system which differ from the core systems shown in FIGS. 1 and 2. However, the error reduction or elimination arrangement added to the basic system of FIG. 1 in FIG. 2 can also, in essence, be used with such variants of the basic system shown in FIG. 1.

Figure 3:
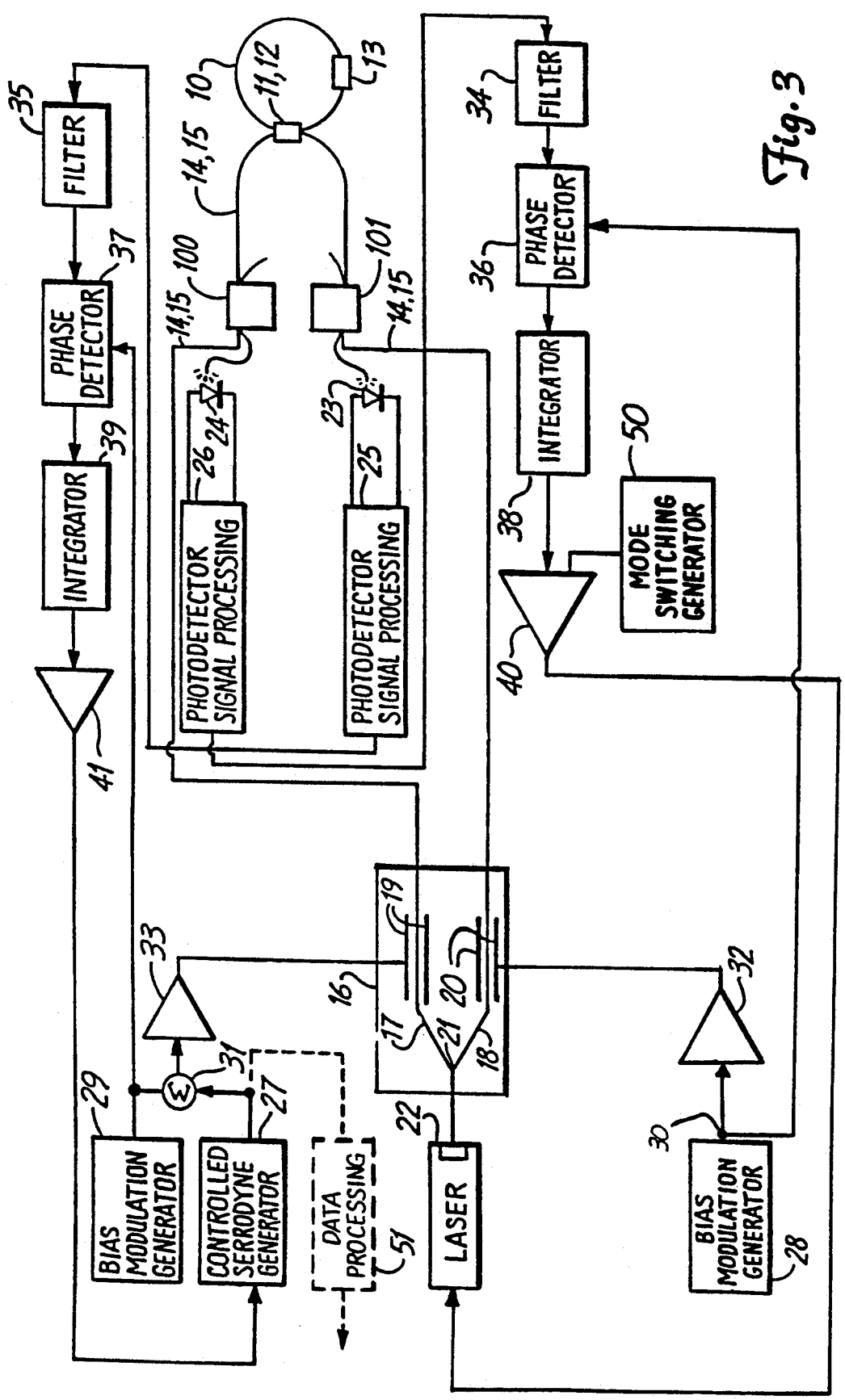
FIG. 3 shows a system schematic diagram of a further resonator fiber optic gyroscope also embodying the present invention combining a signal processing arrangement and an optical transmission path and device arrangement.

For instance, the systems shown in FIGS. 1 and 2 are often termed "transmissive" resonator fiber optic gyroscope systems. A "reflective" resonator fiber optic gyroscope system is another alternative which is shown in FIG. 3, and in which the errors due to asymmetries in adjacent opposite mode resonance peaks are reduced, eliminated or compensated by use of essentially the same minimization system.

The major difference in the "reflective" resonator fiber optic gyroscope system is that there is but a single coupler optically connecting resonator 10 with the remainder of the system. That is, a coupler designated 11,12 is shown in FIG. 3 which couples electromagnetic waves into resonator 10 from, and out of resonator 10 to, an external optical fiber designated 14,15, serving as both the input optical fiber and the output optical fiber for the system. This is possible because of the use of two further optical couplers, 100 and 101, which couple electromagnetic waves from external optical fiber 14,15 to photodetectors 24 and 23, respectively.

The outputs of these photodetectors are again provided to corresponding photodetector bias and signal processing circuits 26 and 25, respectively. Photodetector bias and signal processing circuits 26 and 25 then provide signals to the same kinds of feedback loop arrangements in FIG. 3 as similarly designated photodetector bias and signal processing circuits do in the system of FIG. 2.

The major difference in operation here is that the electromagnetic waves reaching photodetectors 23 and 24 are not only those waves which have been circulating in resonator 10 but also corresponding portions of the input electromagnetic waves which are not coupled into resonator 10 by optical coupler 11,12. Thus, there are two pairs of electromagnetic waves in external fiber 14,15 with each member of each pair following a different path than the other, and with each pair reaching a corresponding one of photodetectors 23 and 24. This leads to each pair member interfering with the other in that pair in impinging on the photodetector corresponding to that pair. That is, the electric field components of the electromagnetic waves reaching photodetector 23 can be represented as $$E_{d-23} = C_1 q E'_{in} + C_2 E_{ccw},$$

where $E_{d-23}$ represents the electric field component of the electromagnetic waves reaching photodetector 23, $qE'_{in}$ represents the input electromagnetic radiation provided through integrated waveguide 17, $E_{ccw}$ represents the counterclockwise electromagnetic waves which have been coupled back into external fiber 14,15 from resonator 10, and constants $c_1$ and $c_2$ represent the effects of various fractional couplings, losses, and phase delays on these Similarly, the electric field components of the electromagnetic waves reaching photodetector 24 can be represented as $$E_{d-24} = c_3 pE'_{in} + c_4 E_{cw}.$$

with $E_{d-24}$ representing the electric field component of the electromagnetic waves reaching photodetector 24, $pE'_{in}$ representing the electromagnetic wave electric field component in external fiber 14,15 provided through integrated waveguide 18, $E_{cw}$ representing the clockwise traveling electromagnetic waves which have been coupled back into external optical fiber 14,15 from resonator 10, and constants $c_3$ and $c_4$ again representing various fractional couplings, losses and phase delays on these electromagnetic wave electric field components reaching photodetector 24.

Because the electric field components from two different optical paths in the electromagnetic waves reaching photodetectors 23 and 24 will interfere with each other upon arrival, the intensities at these detectors must be written as $$I_{d-23} = E_{d-23} \cdot E^*_{d-23} = |C_{1q}E'_{in}|^2 + |C_2 E_{ccw}|^2 + 2|C_{1q}E'_{in}||C_2 E_{ccw}|\cos\sigma_1,$$

$$I_{d-24} = E_{d-24} \cdot E^*_{d-24} = |c_3 pE'_{in}|^2 + |c_4 E_{cw}|^2 + 2|c_3 pE'_{in}||c_4 E_{cw}|\cos\sigma_2,$$

with $\sigma$ being the phase difference between the components of the electromagnetic waves from two paths reaching a corresponding photodetector. As a result, the equations characterizing the system of FIG. 3 will differ somewhat from the equations given previously characterizing the system of FIG. 2. In fact, the occurrence of resonance in resonator 10 leading to a peak in the electromagnetic energy therein at the frequency given such resonance will lead to a cancellation at the photodetectors in FIG. 3 so that resonance is represented by a null in the intensity impinging on those photodetectors. Nevertheless, an analysis of the system of FIG. 3 taking these differences into account will yield equations showing a similar result for the resonator mode couplings and coupler mode differential couplings and losses effects rotational rate error. Thus, a similar error minimization arrangement can be used with the system of FIG. 3 as was used with the system of FIG. 2.

Although the present invention has been described with reference to preferred embodiments, workers skilled in the art will recognize that changes may be made in form and detail without departing from the spirit and scope of the invention.

What is claimed is:

1. An error reducer for reducing rotation rate errors arising because of polarization modes coupling and differing polarization modes characteristics associated with a coiled optical fiber having a pair of principal/birefringent axes in a rotation sensor capable of sensing rotation about a symmetry axis of said coiled optical fiber forming a closed optical path having a transfer means therealong for transferring electro radiation propagating along one of said principal birefringent axes into propagating along another of said axes, said coiled optical fiber connected with at least a first coil coupler such that electromagnetic waves can be coupled between said coiled optical fiber and a first external optical fiber, said rotation sensing based on having opposing electromagnetic waves propagating through said coiled optical fiber in opposing directions so as to result in each said opposing coiled optical fiber electromagnetic wave impinging at least in part on a corresponding one of first and second photodetectors with at least one of said opposing coiled optical fiber electromagnetic waves propagating in one of said opposing directions being subject to having frequencies thereof varied by selected signals supplied to a first input of a source means capable of supplying an emitted electromagnetic wave from which that said opposing coiled optical fiber electromagnetic wave is obtained, said first photodetector providing an output signal in response to such impingement thereon of a corresponding said opposing coiled optical fiber electromagnetic wave which is representative of that wave, said error reducer comprising:

oscillating frequency value establishment means having an output electrically connected to said first input of said source means, said oscillating frequency value establishment means being capable of providing an output signal on said output thereof sufficient to cause said source means to direct said opposing coiled optical fiber electromagnetic waves propagating in one of said opposing directions subject to having frequencies thereof varied by selected signals supplied to a first input of said source means, as aforesaid, to oscillate in frequency value between frequencies occurring substantially in opposite polarization mode resonances of those said waves.

2. The apparatus of claim 1 wherein an opposite one of said opposing coiled optical fiber electromagnetic waves propagating in one of said opposing directions is subject to having phasing thereof varied by selected signals supplied to a first input of a first phase modulator, and wherein said first external optical fiber is positioned with respect to said first phase modulator such that electromagnetic waves passing through at least a portion thereof also pass through said first phase modulator so as to be subject to having phases thereof varied in response to selected signals applied to said first phase modulator first input.

3. The apparatus of claim 1 wherein said transfer means is a splice in said coiled optical fiber on either side of which said principal birefringent axes are rotated with respect to those said axes on an opposite side.

4. The apparatus of claim 1 further comprising a first controlled frequency adjustment signal generator means having a frequency adjustment input and having an output electrically connected to said first phase modulator so as to be capable of providing a phase modulation component in an opposite one of said opposing coiled optical fiber electromagnetic waves, said first controlled frequency adjustment signal generator means being capable of providing an output signal at said output thereof having a basic waveform repeated at a selected first shift operation frequency of a value selected based on signals appearing on said frequency adjustment input.

5. The apparatus of claim wherein error residuals are reduced by a compensating means.

6. The apparatus of claim wherein error residuals are reduced by substantially equalizing intensities of said opposing coiled optical fiber electromagnetic waves.

7. The apparatus of claim 2 wherein said first external optical fiber and said first phase modulator are part of a coiled optical fiber input means capable of having opposing electromagnetic waves, supplied from a said source means, propagate commonly through both of said first external optical fiber and said first phase modulator in opposite directions.

8. The apparatus of claim 2 wherein said first external optical fiber has first and second output couplers connected therewith such that electromagnetic waves can be coupled between said first external optical fiber and a corresponding output optical path leading to a corresponding one of said first and second photodetectors.

9. The apparatus of claim 2 wherein said coiled optical fiber has a second coil coupler connected therewith such that electromagnetic waves can be coupled between said coiled optical fiber and a second external optical fiber, said second coil coupler having a pair of ends each positioned so that electromagnetic waves emanating therefrom impinge on a corresponding one of said first and second photodetectors.

10. The apparatus of claim 3 wherein error residuals are reduced by substantially equalizing intensities of said opposing coiled optical fiber electromagnetic waves.

11. The apparatus of claim 3 wherein said rotation of said principal birefringent axes on either side of said splice with respect to those in that side opposite is substantially 90°.

12. The apparatus of claim 4 wherein said first controlled frequency adjustment signal generator means has said output thereof electrically connected to said first phase modulator first input through a first resonance determination summing means having a first input electrically connected to said first controlled frequency adjustment signal generator means output and having an output electrically connected to said first phase modulator first input, said first resonant determination summing means also having a second input and being capable of combining selected signals provided at said first and second inputs thereof to provide an output signal on said output thereof based on such combined signals; and wherein said apparatus further comprises a first resonance determination signal generating means having an output electrically connected to said first resonance determination summing means second input, said first resonance determination signal generator means being capable of providing an output signal containing a substantial signal component at a selected resonance monitoring frequency.

13. The apparatus of claim 4 further comprising a first supplementary phase modulator positioned with respect to said first phase modulator such that electromagnetic waves subject to having phases thereof varied in response to selected signals applied to said first phase modulator first input are also subject to having phases thereof varied in response to selected signals applied to a first input of said first supplementary phase modulator; and wherein said apparatus yet further comprises a first resonance determination signal generating means having an output electrically connected to said first supplementary phase modulator first input, said first resonance determination signal generator means being capable of providing an output signal containing a substantial signal component at a selected resonance monitoring frequency.

14. The apparatus of claim 4 further comprising a first signal component selection means having an input electrically connected to said first photodetector to receive said first photodetector output signal, and an output electrically connected to said first controlled frequency adjustment signal generator means frequency adjustment input, said first signal component selection means being capable of extracting a desired signal component from said first photodetector output signal and providing an output signal based thereon at said output thereof.

15. The apparatus of claim 10 wherein error residuals are reduced by a compensating means.

16. The apparatus of claim 14 further comprising a second signal component selection means having an input electrically connected to said second photodetector to receive said second photodetector output signal, and an output electrically connected to said first input of said source means, said second signal component selection means being capable of extracting a desired signal component from said second photodetector output signal and providing an output signal based thereon at said output thereof.

17. The apparatus of claim 14 wherein a time integration means is electrically connected between said first signal component selection means output and said first controlled frequency adjustment signal generating means frequency adjustment input.

18. The apparatus of claim 16 wherein both said oscillating frequency value establishment means output and said second signal component selection means output are electrically connected to said first input of said source means through a combining means.

19. The apparatus of claim 16 wherein a time integration means is electrically connected between said second signal component selection means output and said first input of said source means.

* * * * *

UNITED STATES PATENT AND TRADEMARK OFFICE
CERTIFICATE OF CORRECTION

PATENT NO. : 5,296,912
DATED : Mar. 22, 1994
INVENTOR(S) : LEE K. STRANDJORD, et al.

It is certified that error appears in the above-indentified patent and that said Letters Patent is hereby corrected as shown below:

Column 43, line 54, delete "/-"

Column 43, line 58, cancel "electro" and substitute -- electromagnetic --

Column 44, line 44, cancel "1" and substitute -- 2 --

Column 44, line 57, after "claim" insert -- 1 --

Column 44, line 59, after "claim" insert -- 1 --

Signed and Sealed this

Twentieth Day of September, 1994

Attest:

BRUCE LEHMAN

Attesting Officer

Commissioner of Patents and Trademarks